United States Patent
Froese et al.

(10) Patent No.: US 10,129,329 B2
(45) Date of Patent: *Nov. 13, 2018

(54) APPARATUS AND METHOD FOR DEADLOCK AVOIDANCE

(71) Applicant: Cray Inc., Seattle, WA (US)

(72) Inventors: Edwin L. Froese, Burnaby (CA); Eric P. Lundberg, Eau Claire, WI (US); Igor Gorodetsky, Coquitam (CA); Howard Pritchard, Santa Fe, NM (US); Charles Giefer, Seattle, WA (US); Robert L. Alverson, Seattle, WA (US); Duncan Roweth, Bristol (GB)

(73) Assignee: Cray Inc., Seattle, WA (US)

( * ) Notice: Subject to any disclaimer, the term of this patent is extended or adjusted under 35 U.S.C. 154(b) by 576 days.

This patent is subject to a terminal disclaimer.

(21) Appl. No.: 14/881,157

(22) Filed: Oct. 13, 2015

(65) Prior Publication Data

US 2016/0077997 A1   Mar. 17, 2016

Related U.S. Application Data

(62) Division of application No. 13/798,074, filed on Mar. 12, 2013, now Pat. No. 9,160,607.

(Continued)

(51) Int. Cl.
*G06F 15/167* (2006.01)
*H04L 29/08* (2006.01)
(Continued)

(52) U.S. Cl.
CPC .............. *H04L 67/10* (2013.01); *G06F 8/458* (2013.01); *G06F 9/52* (2013.01); *G06F 9/524* (2013.01);
(Continued)

(58) Field of Classification Search
CPC .... G06F 15/167; G06F 9/52; G06F 15/17381; G06F 8/458; G06F 9/524; G06F 9/54;
(Continued)

(56) References Cited

U.S. PATENT DOCUMENTS 4,891,749 A * 1/1990 Hoffman ................... G06F 9/52
                                                          711/152
5,333,297 A * 7/1994 Lemaire ................ G06F 9/3004
                                                          710/200

(Continued)

OTHER PUBLICATIONS

Almasi, George, et al., "Optimization of MPI Collective Communication on BlueGene/L Systems", "ICS '05 Proceedings of the 19th annual international conference on Supercomputing", Jun. 20-22, 2005, pp. 253-262.

(Continued)

*Primary Examiner* — Philip J Chea
*Assistant Examiner* — Ruth Solomon
(74) *Attorney, Agent, or Firm* — Charles A. Lemaire; Jonathan M. Rixen; Lemaire Patent Law Firm, P.L.L.C.

(57) ABSTRACT

An improved method for the prevention of deadlock in a massively parallel processor (MPP) system wherein, prior to a process sending messages to another process running on a remote processor, the process allocates space in a deadlock-avoidance FIFO. The allocated space provides a "landing zone" for requests that the software process (the application software) will subsequently issue using a remote-memory-access function. In some embodiments, the deadlock-avoidance (DLA) function provides two different deadlock-avoidance schemes: controlled discard and persistent reservation. In some embodiments, the software process determines which scheme will be used at the time the space is allocated.

22 Claims, 6 Drawing Sheets

Related U.S. Application Data

(60) Provisional application No. 61/724,887, filed on Nov. 9, 2012, provisional application No. 61/724,891, filed on Nov. 9, 2012.

(51) Int. Cl.

| | |
|---|---|
| *G06F 8/41* | (2018.01) |
| *G06F 9/52* | (2006.01) |
| *G06F 9/54* | (2006.01) |
| *H04L 12/26* | (2006.01) |
| *H04L 12/751* | (2013.01) |
| *H04L 12/715* | (2013.01) |

(52) U.S. Cl.
CPC .............. *G06F 9/54* (2013.01); *G06F 15/167* (2013.01); *H04L 12/2602* (2013.01); *H04L 43/02* (2013.01); *H04L 45/02* (2013.01); *H04L 45/04* (2013.01); *H04L 67/2842* (2013.01)

(58) Field of Classification Search
CPC .... G06F 13/18; G06F 15/17; G06F 15/17337; G06F 15/8092; G06F 2209/505; G06F 9/30036; G06F 9/3877; G06F 9/3879; G06F 9/3887; G06F 17/30982; G06F 13/16; G06F 2212/602; G06F 3/0659; G06F 2209/521; G06F 9/3004; G06F 9/544; G06F 9/5016; G06F 9/30087; G06F 9/3836; G06F 9/3855; G06F 9/526; G06F 12/084; G06F 12/0875; G06F 12/00; G06F 12/0284; G06F 12/1027; G06F 12/1072; G06F 15/17331; G06F 15/17343; H04L 12/2602; H04L 43/02; H04L 45/02; H04L 45/04; H04L 45/10; H04L 67/10; H04L 67/2842; H04L 45/06; H04L 45/12; H04L 49/101; H04L 49/205; H04L 49/251
USPC .............. 709/212, 226; 710/52, 56; 711/170
See application file for complete search history.

(56) References Cited

U.S. PATENT DOCUMENTS

| | | | |
|---|---|---|---|
| 5,613,071 A * | 3/1997 | Rankin | G06F 12/0284 |
| 5,940,282 A * | 8/1999 | Oglesbee | H02M 1/10 |
| | | | 307/151 |
| 5,940,828 A * | 8/1999 | Anaya | G06F 9/52 |
| 6,016,510 A | 1/2000 | Quattromani et al. | |
| 6,101,420 A | 8/2000 | Van Doren et al. | |
| 6,738,871 B2 * | 5/2004 | Van Huben | G06F 15/17381 |
| | | | 711/124 |
| 6,751,698 B1 * | 6/2004 | Deneroff | G06F 15/17343 |
| | | | 710/317 |
| 6,857,004 B1 | 2/2005 | Howard et al. | |
| 6,925,547 B2 * | 8/2005 | Scott | G06F 12/1072 |
| | | | 370/389 |
| 6,981,074 B2 | 12/2005 | Oner et al. | |
| 7,219,178 B2 | 5/2007 | Harris et al. | |
| 7,443,869 B2 | 10/2008 | Solomon et al. | |
| 7,650,434 B2 | 1/2010 | Blumrich et al. | |
| 7,958,182 B2 * | 6/2011 | Arimilli | G06F 15/17381 |
| | | | 709/201 |
| 7,958,183 B2 * | 6/2011 | Arimilli | G06F 15/17381 |
| | | | 709/201 |
| 8,239,866 B2 * | 8/2012 | Carrie | G06F 9/5027 |
| | | | 711/147 |
| 8,458,267 B2 | 6/2013 | Chen et al. | |
| 8,924,656 B1 * | 12/2014 | Usgaonkar | G06F 3/0614 |
| | | | 711/103 |
| 9,058,122 B1 * | 6/2015 | Nesbit | G06F 3/0659 |
| 9,110,860 B2 | 8/2015 | Shahar | |
| 9,152,603 B1 * | 10/2015 | Kelly, III | G06F 15/17331 |
| 9,164,702 B1 * | 10/2015 | Nesbit | G06F 3/067 |
| 9,229,901 B1 * | 1/2016 | Nesbit | G06F 15/17331 |
| 9,244,880 B2 * | 1/2016 | Philip | G06F 15/17312 |
| 9,495,221 B2 | 11/2016 | Kramer | |
| 2005/0097300 A1 | 5/2005 | Gildea et al. | |
| 2009/0063815 A1 * | 3/2009 | Arimilli | G06F 15/17381 |
| | | | 712/30 |
| 2010/0262822 A1 * | 10/2010 | Honjo | H04L 47/10 |
| | | | 713/153 |
| 2010/0275208 A1 * | 10/2010 | Carrie | G06F 8/451 |
| | | | 718/102 |
| 2013/0054852 A1 * | 2/2013 | Fuoco | G06F 13/4022 |
| | | | 710/110 |
| 2013/0185375 A1 * | 7/2013 | Aho | G06F 15/177 |
| | | | 709/212 |
| 2013/0185381 A1 * | 7/2013 | Aho | G06F 15/177 |
| | | | 709/217 |
| 2015/0331720 A1 * | 11/2015 | Huetter | G06F 9/544 |
| | | | 718/104 |

OTHER PUBLICATIONS

Chen, Dong, et al., "The IBM Blue Gene/Q Interconnection Network and Message Unit", "SC11", Nov. 12-18, 2011, pp. 1-10.

Mellanox Technologies, "CORE-Direct—The Most Advanced Technology for MPI/SHMEM Collectives Offoads", "downloaded from: http://www.mellanox.com/pdf/whitepapers/TB_CORE-Direct.pdf", May 2010.

Mellanox Technologies, "Fabric Collective Accelerator (FCA)", "download from web-address: http://www.mellanox.com/related-docs/prod_acceleration_software/FCA.pdf", 2011.

Shainer, Gilad, et al., "Accelerating High Performance Computing Applications Through MPI Offloading", "HPC Advisory Council", 2011, Publisher: downloaded from: http://www.hpcadvisorycouncil.com/pdf/WP_Accelerating_HPC_%20Apps_through_MPI_Offloading.pdf.

\* cited by examiner

NIF BLOCK DIAGRAM

APPARATUS AND METHOD FOR DEADLOCK AVOIDANCE

CROSS-REFERENCE TO RELATED APPLICATION

This application is a divisional of U.S. patent application Ser. No. 13/798,074 filed on Mar. 12, 2013 (which issued as U.S. Pat. No. 9,160,607 on Oct. 13, 2015), which claims priority benefit, under 35 U.S.C. § 119(e), of U.S. Provisional Patent Application No. 61/724,887 filed Nov. 9, 2012 by Edwin Froese et al., titled "Method and apparatus for deadlock avoidance," and U.S. Provisional Patent Application No. 61/724,891 filed Nov. 9, 2012 by Edwin Froese et al., titled "Collective engine method and apparatus," each of which is incorporated herein by reference in its entirety.

FIELD OF THE INVENTION

The invention relates generally to computer software and/or hardware, and more particularly to methods and apparatus to prevent deadlocks in a multiprocessor environment.

BACKGROUND OF THE INVENTION

A massively parallel processor (MPP) is one type of supercomputer. An MPP consists of a large number of independent computing nodes (processors and memory) interconnected with a specialized high-speed network. The number of nodes in a supercomputer can be in the thousands. An application or task running on an MPP is divided into many subtasks, each of which executes on its own node. The subtasks execute in parallel, each subtask computing a portion of the final result. These individually computed results, in general, need to be combined multiple times during the execution of the overall application, with the combined intermediate result being sent back to each of the nodes running the subtasks of the application.

When the processes on the plurality of nodes in an MPP interact, the possibility of deadlock exists. Deadlock is a situation in which two or more processes are waiting for mutual messages or for related events to occur, but neither receives the notification, and just continues to wait. Deadlock can result from programming errors. Deadlock may also be a result of a hardware implementation, such that occasionally, due to hardware conditions, a possibility exists that the messages or notifications block each other, will never get sent to the waiting processes, and the processes end up deadlocked. In some computing environments, it may be acceptable to detect after-the-fact that deadlock has occurred and to correct the problem. This is not acceptable in a supercomputing MPP environment, where the number of interacting processes can be in the thousands. Even a very small possibility of deadlock can have large impacts on overall application performance.

There remains a need in the art for an improved engine and method for performing deadlock avoidance in an MPP.

BRIEF SUMMARY OF THE INVENTION

In some embodiments, the present invention includes a method for the prevention of deadlock in an MPP system. Prior to a subtask (a portion of application software) sending and receiving messages from another subtask, the subtask allocates space in a deadlock-avoidance FIFO (first-in-first-out buffer). The allocated space provides a "landing zone" for requests that the software process (the application software) will subsequently issue using the fast memory access (FMA). The FMA function provides software with windows into the memory space of remote nodes, allowing software running at the local node to PUT and GET data directly to and from the remote node's memory. The FMA forwards remote-memory-access requests to the deadlock-avoidance (DLA) function (also referred to as a deadlock-avoidance engine). The purpose of the DLA function is to prevent deadlock cycles, involving traffic flows between nodes, by isolating software processes from back-pressure exerted by the Network interconnecting the nodes. In some embodiments of the present invention, the deadlock-avoidance (DLA) function provides two different deadlock-avoidance schemes: Controlled Discard and Persistent Reservation. The software process selects the scheme that will be used at the time the space is allocated.

In some embodiments, the present invention provides a computer-implemented method and/or system for deadlock avoidance in a parallel-processor system, wherein the parallel-processor system includes a plurality of nodes, wherein each one of the plurality of nodes includes a node buffer, a processor and local memory, wherein the plurality of nodes includes a first node having a first node buffer, a second node having a second node buffer, and a third node having a third node buffer, wherein each node is operatively coupled to a plurality of other nodes, and wherein a software process executes on each one of the plurality of nodes, the method comprising: receiving, in the first node, a first command from a first software process executing in the processor of the first node, to reserve N1 allocation units of space in the first node buffer for communication between the first software process executing in the processor of the first node and other software processes executing in processors of other nodes, wherein N1 is a number between one and a total size of the first node buffer, checking whether the first node buffer contains at least N1 unreserved allocation units of space to satisfy the first command, and if N1 unreserved allocation units now exist in the first node buffer, then reserving N1 allocation units for use by the first process, but if N1 unreserved allocation units do not now exist then denying the first command for allocation units of space, entering a first remote-memory-access request from the first software process into the first node buffer, indicating that an additional one of the allocation units in the first node buffer is in use, performing a first remote-memory-access operation by sending the first remote-memory-access request over the network to the second node, and communicating data between the second node and the first node based on the first remote-memory-access request, removing the first remote-memory-access request from the first node buffer, indicating that one of the allocation units in the first node buffer is no longer in use, entering a second remote-memory-access request from the first software process into the first node buffer, indicating that an additional one of the allocation units in the first node buffer is in use, performing a second remote-memory-access operation by sending the second remote-memory-access request over the network to the third node, which causes the third node to communicate data between the third node and the first node, removing the second remote-memory-access request from the first node buffer, indicating that one of the allocation units in the first node buffer is no longer in use, and receiving, in the first node, a second command from a first software process executing in the processor of the first node, to un-reserve N1 allocation units of space in the first node buffer of the first node, and un-reserving N1 allocation units of space in the node buffer of the first node.

In some embodiments, when using the Controlled Discard scheme, software issues an allocation request to the deadlock-avoidance engine indicating the amount of space it needs for a block of requests it is about to issue and can immediately follow the allocation request with those requests. The deadlock-avoidance engine allocates space for the entire block if it has sufficient space available. Otherwise, the deadlock-avoidance engine discards all requests of the block. An indication is returned to application software of whether or not the allocation was successful. If the allocation was not successful, the application software later retries the allocation and the corresponding block of requests. Therefore, the application software must retain the state information that it requires to be able to retry the block until it determines that the allocation for the block was accepted by the deadlock-avoidance engine. Application software may issue successive blocks in pipeline fashion without first waiting for the allocation success or failure notification of prior blocks.

In some embodiments, when using the Persistent Reservation scheme, a software process (application software) issues an allocation request to the deadlock-avoidance engine indicating an amount of space that is to be reserved within the deadlock-avoidance FIFO. An indication is returned to the application software of whether or not the allocation was successful. Once the application software determines that the allocation was successful, it may use the FMA to send any number of requests, and all will be accepted by the deadlock-avoidance engine provided that the amount of space being occupied in the FIFO never exceeds the allocated amount. This scheme does not require that application software be able to retry requests that have already been issued.

DETAILED DESCRIPTION OF THE INVENTION

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The following abbreviations, among others, appear in the present description: AMO (atomic memory operation); BTE (block-transfer engine); COMP WAT (completion wait); CQ (completion queue); DLA (deadlock avoidance); FIFO (first-in-first-out buffer); HSS (hardware supervisory system); IND (indication); IOMMU (input-output memory-management unit); IRQ (interrupt request); LB (logical block); MAINT (maintenance); MMR (memory-mapped registers); MON (monitor); NAT (network-address translation); NET (network); NICLM (network-interface core-logic monitor); NPT (non-posted table); ORB (outstanding-request buffer); OS (operating system); PARB (processor-interface arbiter); PG (page); RAT (remote-address translation); RD (read); REQ (request); RMT (receive-message table); RSP (response); SSID (synchronization-sequence identification); TARB (transmit arbiter); TBL (table); TRANS (translate); TX (transmit); WC (write combining); WRT (write).

Figure 1:
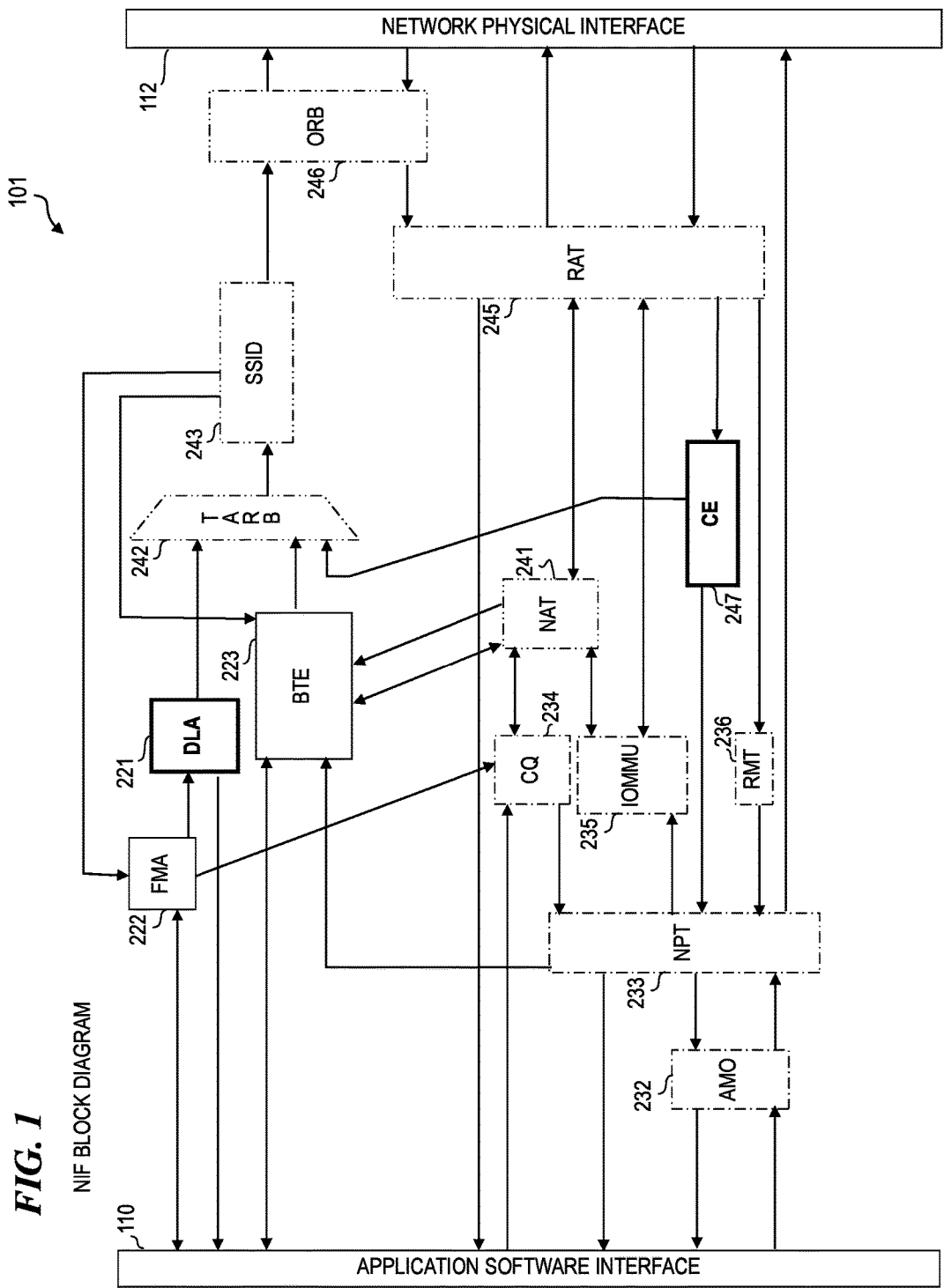
FIG. 1 is a block diagram of a Network Interface Function 101, according to some embodiments of the invention.

FIG. 1 is a block diagram of a network-interface function 101. The network-interface function provides functionality to manage the transfer of data between application software via an application-software interface 110 and a Physical Network Interface 112. In some embodiments, this network is the hardware that forms a high-speed network (HSN) interconnecting the nodes of a massively parallel processor system. The network-interface function (NIF) 101 is a facility to convert traffic from and to a network interface. In some embodiments, the NIF is implemented entirely in software (in some such embodiments, the NIF 201 (all or a substantial number of its components shown in FIG. 2) is implemented in the hardware abstraction layer software (see FIG. 6 described below)). In some embodiments, the NIF is partially implemented in hardware. In other embodiments, the NIF is implemented substantially entirely in hardware.

In some embodiments, the fast memory access (FMA) function 222 (also called a remote-memory-access function) provides software with windows into the memory space of the remote endpoints, allowing software running at the local processor (node) to PUT and GET data directly to and from the remote endpoints' memory. In some embodiments, software may also perform atomic memory operations between local operands and remote memory locations using the atomic-memory-operation function 232 (AMO). Using FMA 222, software at the local processor explicitly controls each element of data that is transferred. Before an operation can be performed an FMA descriptor that will be used to control the operation must first be configured by software. Typically, one or more FMA descriptors are assigned to an application process. In some embodiments, the FMA is implemented entirely in software (in some such embodiments, the FMA is implemented in the hardware abstraction layer software (see FIG. 6 described below)). In some embodiments, the FMA is partially implemented in hardware. In other embodiments, the FMA is entirely implemented in hardware. In some embodiments, the descriptors are stored in memory-mapped registers (MMRs) in the FMA unit. In some embodiments, each FMA supports 127 FMA descriptors. In other embodiments, each FMA supports between 64 and 128 descriptors. In other embodiments, each FMA supports between 96 and 192 descriptors. In other embodiments, each FMA supports between 128 and 256 descriptors.

In some embodiments, the block-transfer engine (BTE) 223 provides software running at the local processor with the ability to transfer potentially large blocks of data to and from the memory of remote endpoints by issuing just a single transaction request. In using BTE, a software application is off-loaded from performing the actual element-by-element data transfer, and so is able to perform other processing while the actual transfer is taking place. In some embodiments, the BTE is implemented entirely in software (in some such embodiments, the BTE is implemented in the hardware abstraction layer software (see FIG. 6 described below)). In some embodiments, the BTE is partially implemented in hardware. In other embodiments, the BTE is entirely implemented in hardware.

In some embodiments, the FMA 222 forwards remote-memory-access requests to the deadlock-avoidance (DLA) engine 221 (also referred to as the DLA function or simply DLA). The purpose of the DLA engine 221 is to prevent deadlock cycles, involving traffic flows between nodes, by isolating software processes from back-pressure exerted by the high-speed network (HSN). The DLA function includes a large buffer (in some embodiments, a first-in-first-out buffer (FIFO)) for absorbing network-bound requests. If the rate at which HSN-bound requests, arriving from FMA, exceeds the rate at which the network is accepting requests such that the FIFO becomes full, the DLA engine discards subsequent requests arriving from FMA. In some embodiments, the DLA engine includes mechanisms to partition the FIFO space between the different FMA descriptors, and mechanisms to allow software to interact with the FIFO fill level and to be informed of any discards that may have occurred. The DLA engine forwards the HSN-bound requests to a transmit arbiter (TARB) 242. In some embodiments, the DLA is implemented entirely in software (in some such embodiments, the DLA is implemented in the hardware abstraction layer software (see FIG. 6 described below)). In some embodiments, the DLA is partially implemented in hardware. In other embodiments, the DLA is entirely implemented in hardware.

In some embodiments, the collective-engine (CE) function 247 provides the ability to perform rapid reductions of small quantities of data across potentially many software processes running at many network endpoints. Each CE function supports a plurality of virtual CEs. To facilitate scaling, software configures virtual connections between virtual CEs such that the virtual CEs are arranged in an inverted-tree structure. The software processes join a reduction by issuing requests to the virtual CEs at the bottom of the tree. Partial reduction results propagate upward toward the root of the tree. The final reduction result propagates back down the tree and is delivered to the participating processes by the virtual CEs at the bottom of the tree. In some embodiments, the CE is implemented entirely in software (in some such embodiments, the CE is implemented in the hardware abstraction layer software (see FIG. 6 described below)). In some embodiments, the CE is partially implemented in hardware. In other embodiments, the CE is entirely implemented in hardware.

In some embodiments, the transmit arbiter (TARB) 242 arbitrates the request packets from DLA 221, BTE 223, and CE 247 and passes the requests, unmodified, to a synchronization-sequence-identification (SSID) function 243. In some embodiments, the TARB 242 is implemented entirely in software (in some such embodiments, the TARB 242 is implemented in the hardware abstraction layer software (see FIG. 6 described below)). In some embodiments, the TARB 242 is partially implemented in hardware. In other embodiments, the TARB 242 is entirely implemented in hardware.

In some embodiments, the synchronization-sequence-identification (SSID) function 243 tracks request-packet sequences. Each sequence corresponds to a different transaction. Based on special packets that are issued from the request sources (FMA, BTE, CE) to mark the beginning and end of transactions and the particular FMA descriptor, BTE channel, or virtual CE that the packet is associated with, the SSID assigns each request packet destined for the network to its correct sequence and inserts a sequence identifier (ssid value) into the packet. The network-bound request is forwarded on to an outstanding-request-buffer (ORB) 246 function. In some embodiments, the SSID is implemented entirely in software (in some such embodiments, the SSID is implemented in the hardware abstraction layer software (see FIG. 6 described below)). In some embodiments, the SSID is partially implemented in hardware. In other embodiments, the SSID is entirely implemented in hardware.

In some embodiments, the outstanding-request-buffer (ORB) function 246 tracks packets. The ORB assigns and inserts a packet ID value into each request forwarded to the network physical interface 112. A response with the same packet ID value is expected to be eventually returned. Fetching requests are expected to return a response that contains data that will be written to the memory of the local processor. For Fetching requests, the ORB 246 retains the local address information contained in the request. The local address information will eventually be needed to write the response data to memory. The local address information is stripped off of the request before it is forwarded to the network physical interface. In some embodiments, the ORB is implemented entirely in software (in some such embodiments, the ORB is implemented in the hardware abstraction layer software (see FIG. 6 described below)). In some embodiments, the ORB is partially implemented in hardware. In other embodiments, the ORB is entirely implemented in hardware.

In some embodiments, remote-address-translation (RAT) 245 and network-address-translation (NAT) 241 functions provide for validation of requests targeting the local processor's memory. Requests targeting the memory of the local processor, such as PUTs and AMOs from remote endpoints, and GET responses, are validated before being delivered to the software application to confirm they are authorized and fall within the bounds of the targeted memory domain. The remote-address-translation (RAT) 245 and network-address-translation (NAT) 241 functions are involved in the validation. The authorization is performed through a protection-tag (PTAG)/protection-key (PKEY) mechanism. Each network request carries a PKEY value. PKEY values are derived from PTAG values configured by software. For a request to be authorized its PKEY value must correspond to the PTAG value configured for the targeted memory domain. In some embodiments, the RAT and NAT are implemented entirely in software (in some such embodiments, the RAT and NAT functions are implemented in the hardware abstraction layer software (see FIG. 6 described below)). In some embodiments, the RAT and NAT are partially implemented in hardware. In other embodiments, the RAT and NAT are entirely implemented in hardware.

In some embodiments, an input/output memory-management unit (IOMMU) 235 supports memory management by providing memory page translation for requests targeting the local processor's memory. The input/output memory-management unit (IOMMU) is involved in this translation. In some embodiments, the IOMMU is implemented entirely in software (in some such embodiments, the IOMMU is implemented in the hardware abstraction layer software (see FIG. 6 described below)). In some embodiments, the IOMMU is partially implemented in hardware. In other embodiments, the IOMMU is entirely implemented in hardware.

In some embodiments, a receive-message-table (RMT) function 236 provides mechanisms based on completion queues and interrupt requests for notifying software of significant events, such as the complete reception of a message targeting the local processor, and global visibility of the results of a sequence of requests issued by the local processor. The synchronization-sequence-identification (SSID) function 243, receive-message-table (RMT) function 236, and completion-queue (CQ) 234 functions are the principal entities involved. Certain types of requests can be tracked by the RMT for the purpose of issuing a completion notification when all requests of a message have been received. If the request is of this type, the RMT updates its table of message state information. (The RMT maps individual request packets to messages based on the source endpoint ID of the request and the ssid value contained in the request.) In some embodiments, the RMT is implemented entirely in software (in some such embodiments, the RMT is implemented in the hardware abstraction layer software (see FIG. 6 described below)). In some embodiments, the RMT is partially implemented in hardware. In other embodiments, the RMT is entirely implemented in hardware.

In some embodiments, a non-posted-table (NPT) function 233, forward requests received to the atomic-memory-operation (AMO) function 232. For each request received from the HSN, a response is returned to the source endpoint. The NPT 233 is responsible for forwarding the request's response to the HSN via the network's physical interface 112. For fetching requests, the response to the network's physical interface can only be issued after the data to be returned in the response has been received from the AMO function, which, in turn, is generally dependent on having received the data from a software process. The NPT is responsible for tracking each request for which a response is outstanding, and for matching each response received from the AMO function with the corresponding outstanding request. For non-fetching requests, the NPT can issue the response immediately upon forwarding the request on to the AMO function, or optionally, can request a response in the request that it forwards to the AMO function, and only return the response to the network upon receiving the response from the AMO function. In some embodiments, the NPT are implemented entirely in software (in some such embodiments, the NPT is implemented in the hardware abstraction layer software (see FIG. 6 described below)). In some embodiments, the NPT and AMO are partially implemented in hardware. In other embodiments, the NPT and AMO are entirely implemented in hardware.

The term "node" refers to a memory hierarchy and set of processing resources attached to a single network interface. In some embodiments, a node may contain one or more processors together with local memory. Local memory refers to the memory hierarchy within a node. In some embodiments, local memory may be part of a cache-coherent domain (an intra-node domain). Remote memory refers to memory on a different node. Local memory can be accessed by a processor at the node using load and store operations.

The term "network endpoint," or simply "endpoint," is usually equivalent to node. In some embodiments, it is possible to have multi-ported nodes. A multi-ported node is one which is connected to more than one network interface. In the case of a multi-ported node, the terms node and network endpoint are not quite equivalent, as a multi-ported node appears in the system as more than one network endpoint.

A "sequence" is a series of requests sent from one endpoint to another. These requests may consist of PUT, BTE_SEND, or GET packets. In the case of a PUT or BTE_SEND sequence, it may include a message-complete packet. A "message" consists of a sequence and a completion notification at the destination. The completion notification may include a CQ event or flag data write in the case of a PUT or GET message, or an RX Descriptor writeback in the case of a BTE_SEND message. A "transaction" is more broadly interpreted. A transaction includes one or more sequences or messages, the mechanisms to initiate those sequences, and a source-side completion notification (SSCN). For example, a transaction may be used to send a single message from the FMA. In this case, the transaction includes the programming of the FMA, the transmission of the message, and the source-side completion notification. However, a transaction could also be used to perform a series of PUT or GET sequences involving different destination endpoints. In this case, the SSCN provides the following information: that the transaction is complete, that all GET responses are visible at the source, and whether or not the transaction was successful.

A flit (flow control digits) is a sub-portion of a network packet. In some embodiments, large network packets are broken into small pieces called flits (flow control digits). The first flit, called the header flit, holds information about this packet's route (namely the destination address) and sets up the routing behavior for all subsequent flits associated with the packet. The head flit is followed by zero or more body flits, containing the actual payload of data. The final flit, called the tail flit, performs some bookkeeping to close the connection between the two nodes. One thing special about wormhole flow control is the implementation of virtual channels.

Figure 2:
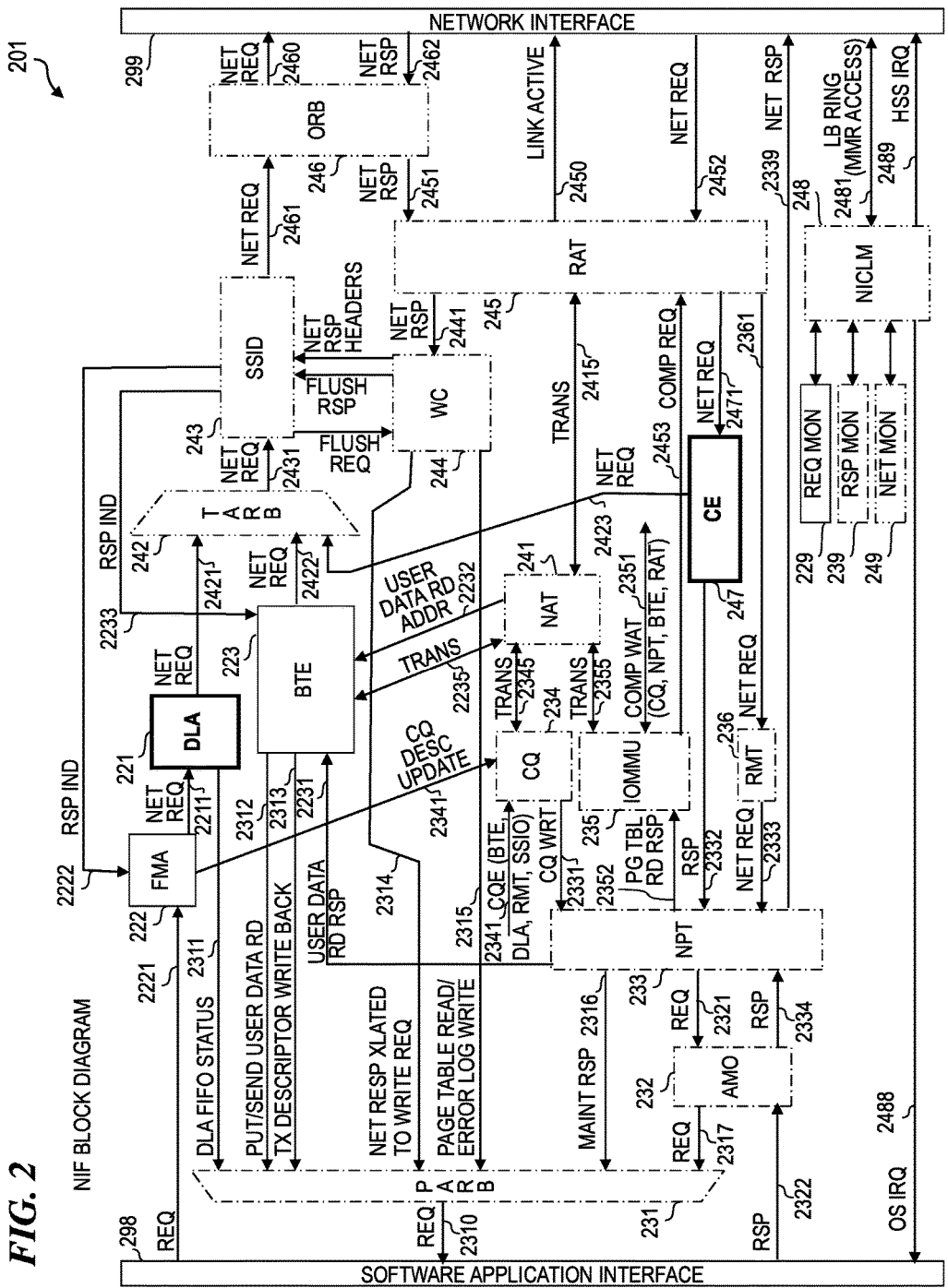
FIG. 2 is a block diagram of a Network Interface Function 201, according to some embodiments of the invention.

FIG. 2 is a block diagram of a network-interface function (NIF) 201 (in some embodiments, some or all of this is implemented in hardware, and so is also sometimes referred to as a network-interface circuit (NIC) 201 in some embodiments, a network-interface core (NIC) in other embodiments, or as a network-interface card (NIC) in yet other embodiments). The network-interface circuit (NIC) 201 has a collective-engine (CE) function 247 and a deadlock-avoidance (DLA) function 221, according to some embodiments of the invention. In some embodiments, NIF 201 includes FMA function 222 that receives, as input, signal REQ 2221 sent from the software application interface 298 of the processor connected to the node (the left side of FIG. 2), and signal RSP IND 2222; FMA function 222 outputs signal NET REQ 2211 sent to DLA function 221, and outputs signal CQ DESC UPDATE 2341 sent to function CQ 234.

In some embodiments, DLA function 221 receives, as input, signal NET REQ 2211; DLA function 221 outputs signal NET REQ 2421 sent to TARB function 242, and outputs signal DLA FIFO STATUS 2311 sent to function PARB 231. In some embodiments, TARB function 242 receives, as input, signal NET REQ 2421 from DLA 221, signal NET REQ 2422 from BTE 223 and signal NET REQ 2423 from CE 247; TARB function 242 outputs signal NET REQ 2431 sent to SSID function 243.

In some embodiments, SSID function 243 receives, as input, signal NET REQ 2431 from TARB function 242, and generates signals NET REQ 2461 sent to ORB 246 and RSP IND 2233 sent to BTE 223; SSID function 243 also generates as output signal FLUSH REQ and in return receives, as input, signal FLUSH RSP from WC 244 and signal NET RSP HEADERS from WC 244.

In some embodiments, BTE function 223 receives as input signals RSP IND 2233 from SSID 243, USER DATA RD RSP 2231 from NPT 233 and USER DATA RD ADDR 2232 from NAT 241, and generates as output signals NET REQ 2422 sent to TARB 242, PUT/SEND USER DATA RD 2312 sent to PARB 231 and TX DESCRIPTOR WRITE BACK 2313 sent to PARB 231. BTE 223 also communicates, as input and output, signal TRANS 2235 to and from NAT 241.

In some embodiments, ORB function 246 receives, as input, signal NET REQ 2461 from SSID function 243, and generates output signal NET REQ 2460; ORB function 246 then receives, as input, signal NET RSP 2462 and generates as output signal NET RSP 2451 sent to RAT function 245.

In some embodiments, RAT function 245 receives, as input, signal NET RSP 2451 from ORB function 246, and generates output signal NET RSP 2441 sent to WC 244; RAT function 245 also receives, as input, signal NET REQ 2452 and generates, as outputs, signal NET REQ 2471 sent to CE function 247 and signal NET REQ 2361 sent to RMT function 236; RAT function 245 also communicates, as input and output, signal TRANS 2415 to NAT 241, receives as input, signal COMP REQ 2453 and generates as output signal LINK ACTIVE 2450.

In some embodiments, WC function 244 receives, as input, signal NET RSP 2441 from RAT function 245, and generates output signal NET RESP XLATED TO WRITE REQ 2314 to PARB function 231 and output signal PAGE TABLE READ/ERROR LOG WRITE 2315 also sent to PARB function 231; WC function 244 receives (from SSID function 243) as input signal FLUSH REQ and in return sends, as output, signal FLUSH RSP and signal NET RSP HEADERS to SSID function 243.

In some embodiments, NAT function 241 communicates, as input and output, signal TRANS 2415 to RAT function 245; communicates, as input and output, signal TRANS 2345 to CQ function 234; communicates, as input and output, signal TRANS 2355 to IOMMU function 235; communicates, as input and output, signal TRANS 2235 to BTE function 223; and generates as output, signal USER DATA RD ADDR 2232 sent to BTE 223.

In some embodiments, CQ function 234 communicates, as input and output, signal TRANS 2345 to NAT function 241; receives, as input, signal CQE (BTE, DLA, RMT, SSIO) 2341 and generates as output CQ WRT 2331 sent to NPT 233.

In some embodiments, IOMMU function 235 receives, as input, signal COMP WAT (CQ, NPT, BTE, RAT) 2351; receives, as input, signal PG TBL RD RSP 2352; communicates, as input and output, signal TRANS 2355 to NAT function 241; and generates, as output, COMP REQ 2453 sent to RAT 245.

In some embodiments, CE function 247 receives, as input, signal NET REQ 2471 from RAT 245; generates, as output, signal NET REQ 2423 sent to TARB function 242; and generates as output, signal RSP 2332 sent to NPT 233.

In some embodiments, RMT function 236 receives, as input, signal NET REQ 2361 from RAT 245; and generates as output, signal NET REQ 2333 sent to NPT 233.

In some embodiments, NPT function 233 receives, as input, signal CQ WRT 2331 from CQ function 234; receives, as input, signal RSP 2332 from CE function 247; receives, as input, signal NET REQ 2333 from RMT function 236; receives, as input, signal RSP 2334 from AMO function 232. NPT function 233 also generates as output, signal USER DATA RD RSP 2231 sent to BTE 223, generates as output, signal REQ 2321 sent to AMO 232, generates as output, signal NET RSP 2339 sent to Network Interface 299, and generates as output, signal MAINT RSP 2316 sent to PARB 231.

In some embodiments, PARB function 231 receives, as input, signal DLA FIFO STATUS 2311 from DLA function 221; receives, as input, signal PUT/SEND USER DATA RD 2312 from BTE function 223; receives, as input, signal TX DESCRIPTOR WRITE BACK 2313 from BTE function 223; receives, as input, signal NET RESP XLATED TO WRITE REQ 2314 from WC function 244; receives, as input, signal PAGE TABLE READ/ERROR LOG WRITE 2315 from WC function 244; receives, as input, signal MAINT RSP 2316 from NPT function 233; and receives, as input, signal REQ 2317 from AMO function 232. PARB function 231 also generates as output, signal REQ 2310 sent to the software application interface 298 of the processor connected to the node.

In some embodiments, AMO function 232 receives, as input, signal REQ 2321 from NPT 233; then generates as output, signal REQ 2317 sent to PARB 231; AMO function 232 also receives, as input, signal RSP 2322 sent from the software application interface 298 of the processor connected to the node, then generates as output, signal RSP 2317 sent to NPT 233.

In some embodiments, NICLM function 248 communicates with REQ MON function 229; communicates with RSP MON function 239; communicates with NET MON function 249; communicates signal LB RING (MMR ACCESS) 2481 with the network interface 299 on the network side (to the right hand side of the FIG. 2); generates as output signal HSS IRQ 2489 sent to the network interface 299, and generates as output signal OS IRQ 2488 sent to the network interface 299.

Deadlock-Avoidance Engine Description

The present invention includes a deadlock-avoidance (DLA) engine or function. In some embodiments, the DLA engine includes a large software-managed FIFO used to guarantee that a request sent towards the high-speed network (HSN) will be able to leave the processor initiating the request. The DLA engine receives requests from the FMA function and enqueues them in its FIFO if space has been reserved for the request. Requests are then passed to the TARB 242 after they are dequeued. Software reserves space in the FIFO by performing allocation requests and can guarantee that all prior requests are dequeued by sending a DLA marker through the FIFO. Allocation status and marker dequeue events are reported through a standard completion-queue (CQ) interface. FIFO status for software use is periodically written to memory. In some embodiments, there are two allocation models allowed by the DLA: Persistent Reservation (PR) and Controlled Discard (CD). Persistent Reservation allows for a more static allocation of the DLA queue among FMA descriptors, while Controlled Discard allows for a more dynamic allocation scheme. While several features of the DLA engine can be used by either allocation scheme, some of the features in the present invention are more pertinent to only one of the allocation schemes.

Figure 3:
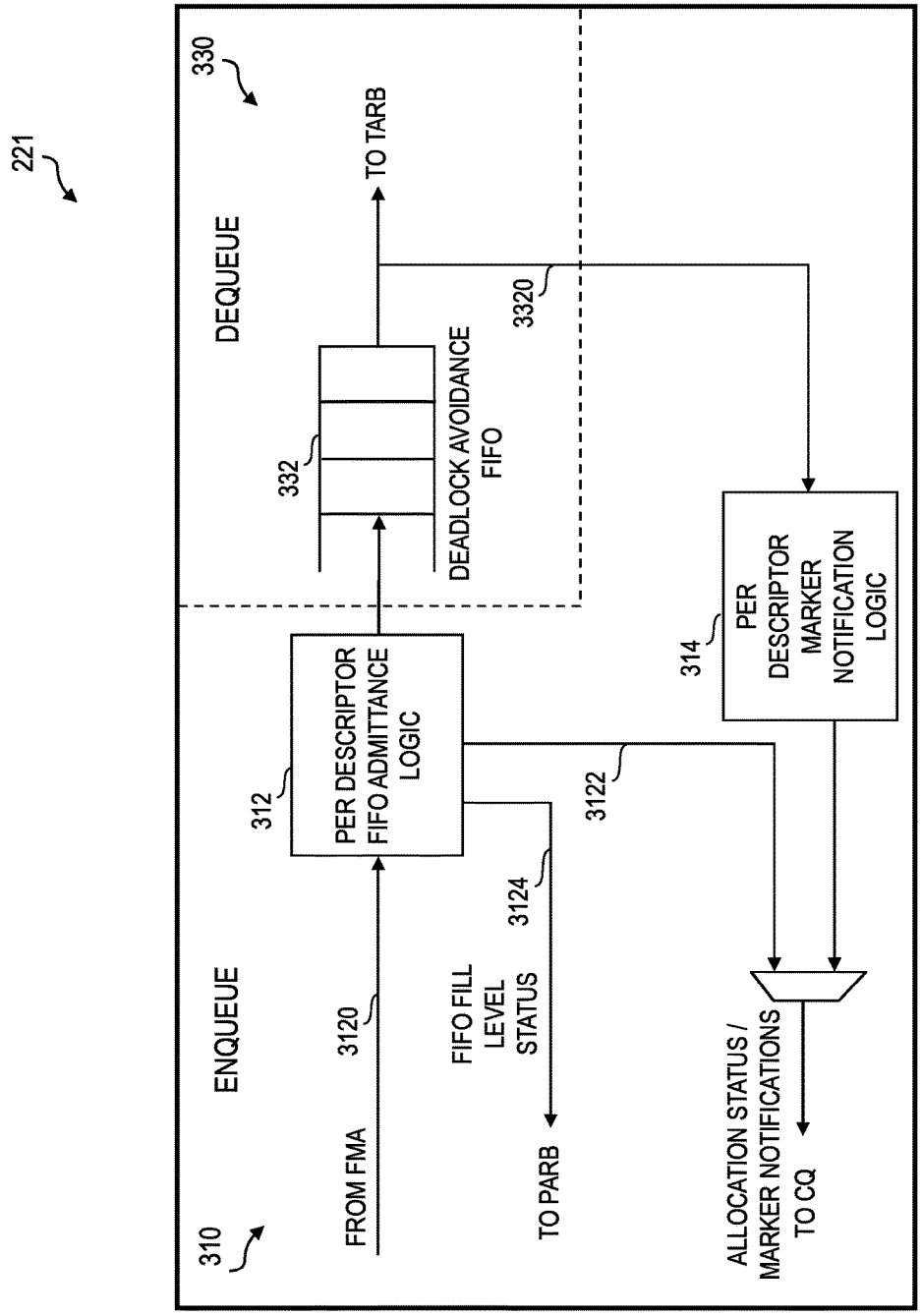
FIG. 3 is a block diagram of a DLA engine 221, according to some embodiments of the invention.

FIG. 3 is a block diagram of a DLA engine 221. The DLA engine is divided into two main sub-functions, enqueue 310 and dequeue 330. The enqueue function 310 processes FIFO allocations and performs packet enqueue checks. The dequeue function 330 takes packets from the enqueue function, writes them to the deadlock FIFO 332, and then reads them and sends them to the TARB 242 for arbitration and network injection. The dequeue function takes DLA markers from the FIFO, sends them 3320 to the Per Descriptor Marker Notification Logic 314 in the enqueue function 310.

The DLA enqueue sub-function decodes packets 3120 from the FMA, performs FIFO allocations and de-allocations 312, and determines if packets will be written to the DLA FIFO. The enqueue function uses FIFO configuration settings, FIFO credits reserved and consumed counts, and per descriptor status to perform these operations. The enqueue function sends allocation status and DLA marker-event data 3122 to the completion queue (CQ). It also updates memory with FIFO allocation status 3124.

Figure 4:
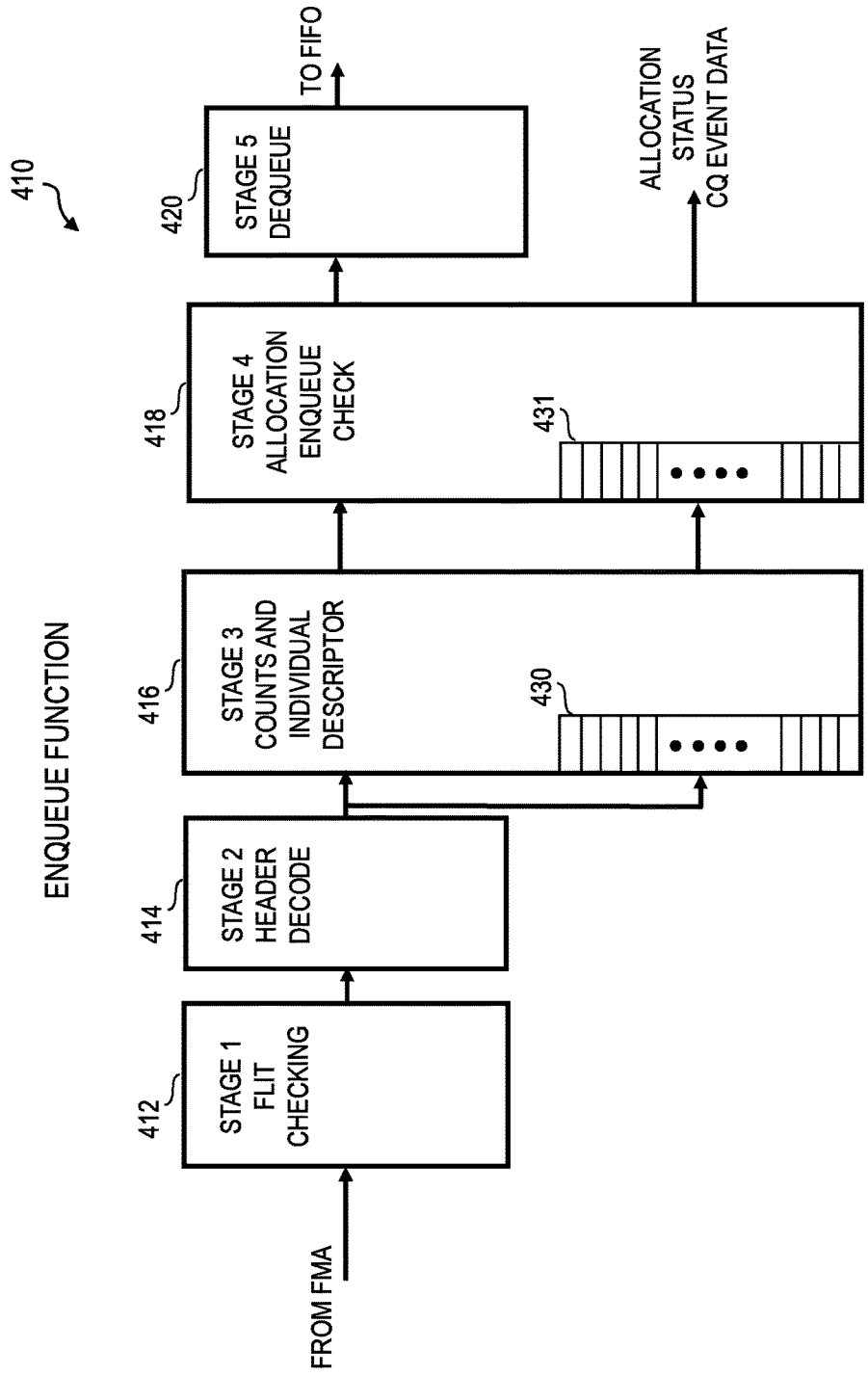
FIG. 4 is a block diagram of the enqueue function 410, according to some embodiments of the invention.

FIG. 4 is a block diagram of the enqueue function 410. In some embodiments, in enqueue-function stage-1 412, header flits are checked for parity errors and single-error correction double-bit-error detection (SECDED) is performed on data flits. Packets with header parity errors are discarded. In some embodiments, DLA-specific packets—AllocSSID, SeqComplete, or DLAMARKER—are checked for a status of A_STATUS_FMA_UNCORRECTABLE or A_STATUS_DATA_ERR. These packets are also dropped. Header-parity-error reporting takes priority over DLA packets with bad status. Packet flits with single-bit data errors are corrected and reported. Double-bit errors are reported only; no other action is taken.

Following data checking in enqueue-function stage-1 412, headers of packets that are used by DLA are decoded in enqueue-function stage-2 414. AllocSSID, SeqComplete, and DLAMARKER packets are used within DLA to start and end transactions and to start and end FIFO allocations within transactions.

FIFO allocation decisions involve FIFO fill status as well as status kept for each individual descriptor. FIFO fill status checks are made for allocations at enqueue-function stage-3 416. A detailed description of FIFO fill status is provided below. One of the individual descriptor enqueue blocks 430 receives a select signal when a packet header is at enqueue-function stage-3. Individual descriptor blocks also receive an enqueue request and an enqueue count signal for packets that are intended to go through DLA and to the TARB.

The decision to allocate or to honor an enqueue request is made at enqueue-function stage-4 418 in the selected descriptor allocate unit packets 431 which pass their enqueue checks are sent to the dequeue unit at enqueue-function stage-5 420 to be entered into the main DLA FIFO.

Figure 5:
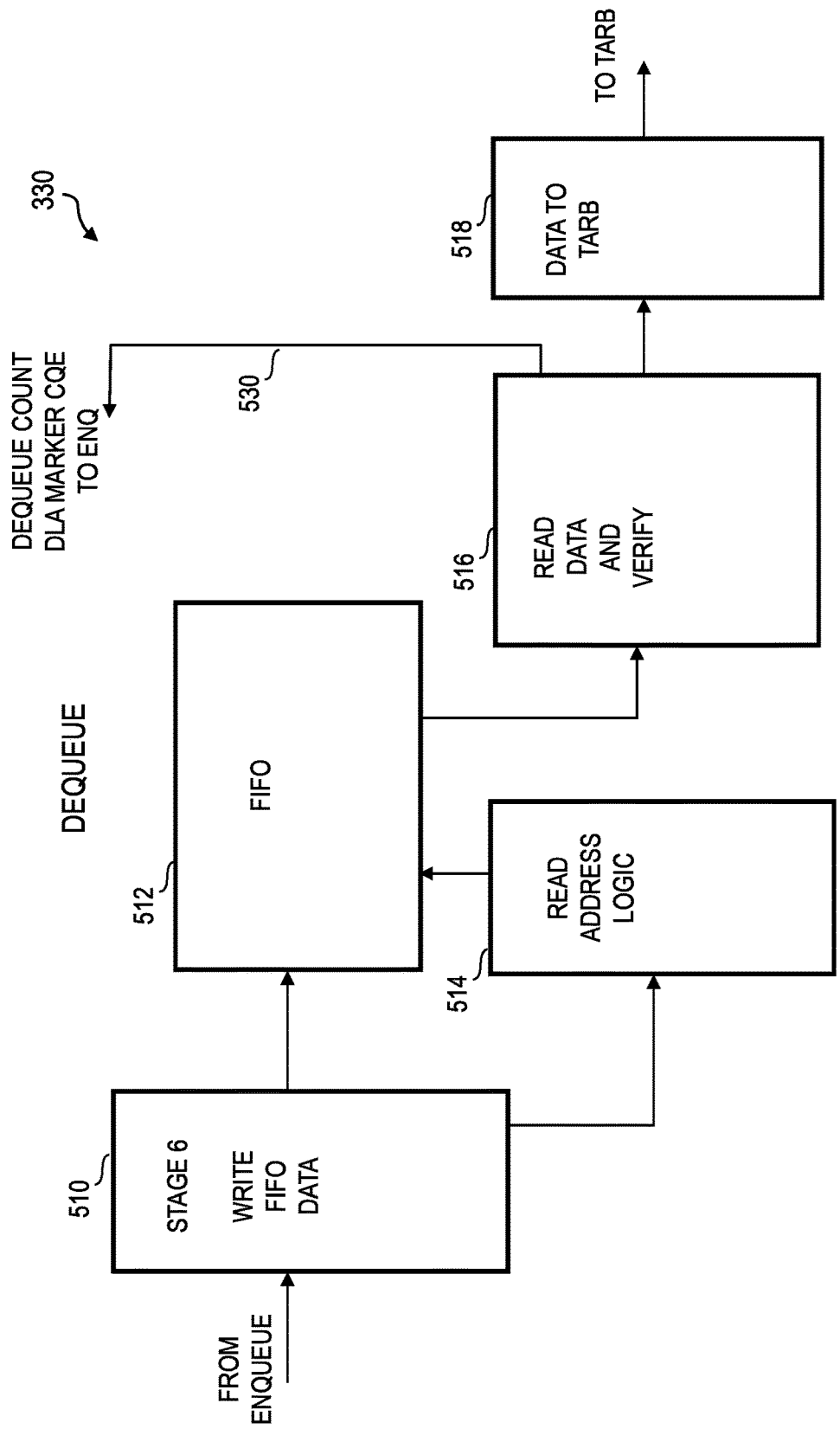
FIG. 5 is a block diagram of the DLA dequeue function 330, according to some embodiments of the invention.

FIG. 5 is a block diagram of the DLA dequeue function 330. The DLA dequeue function receives packets from the enqueue function and stores them 510 in the deadlock FIFO 512, provided they have passed their enqueue checks. Packets that have failed FIFO enqueue checks are discarded. Since the DLA FIFO is large, in some embodiments, packet headers are protected by ECC to meet reliability goals. The packets are marked as low-priority controlled discard, high-priority controlled discard, or persistent-reservation packet type. ECC bits are generated and stored with the packet header flits in stage 6 510. In some embodiments, the ECC bits are generated and checked in hardware. The enqueue type and ECC bits are stored in otherwise unused header bit positions. Packets are stored in the main DLA FIFO and read and sent from there to the TARB 518. Read addresses are generated by Read Address Logic 514 based on information from enqueue stage 6 510. Packets are stored in the DLA queue on a half-flit granularity. This makes the queue storage more efficient for payload sizes of one (1), three (3), five (5), and seven (7) 64-bit words (rounded up to the nearest 64-bit world). After reading from the FIFO, SECDED is performed on packet headers in Read Data and Verify 516. The enqueue type flags are used to send 530 consumed credit decrements back to the enqueue unit. DLA marker information is also sent back to the enqueue function, which generates a CQ event for it. Only the used half-flit is stored in the DLA FIFO for tail flits where the upper data is not valid. On dequeue, the unused half-flit is inserted to restore the original packet.

Figure 6:
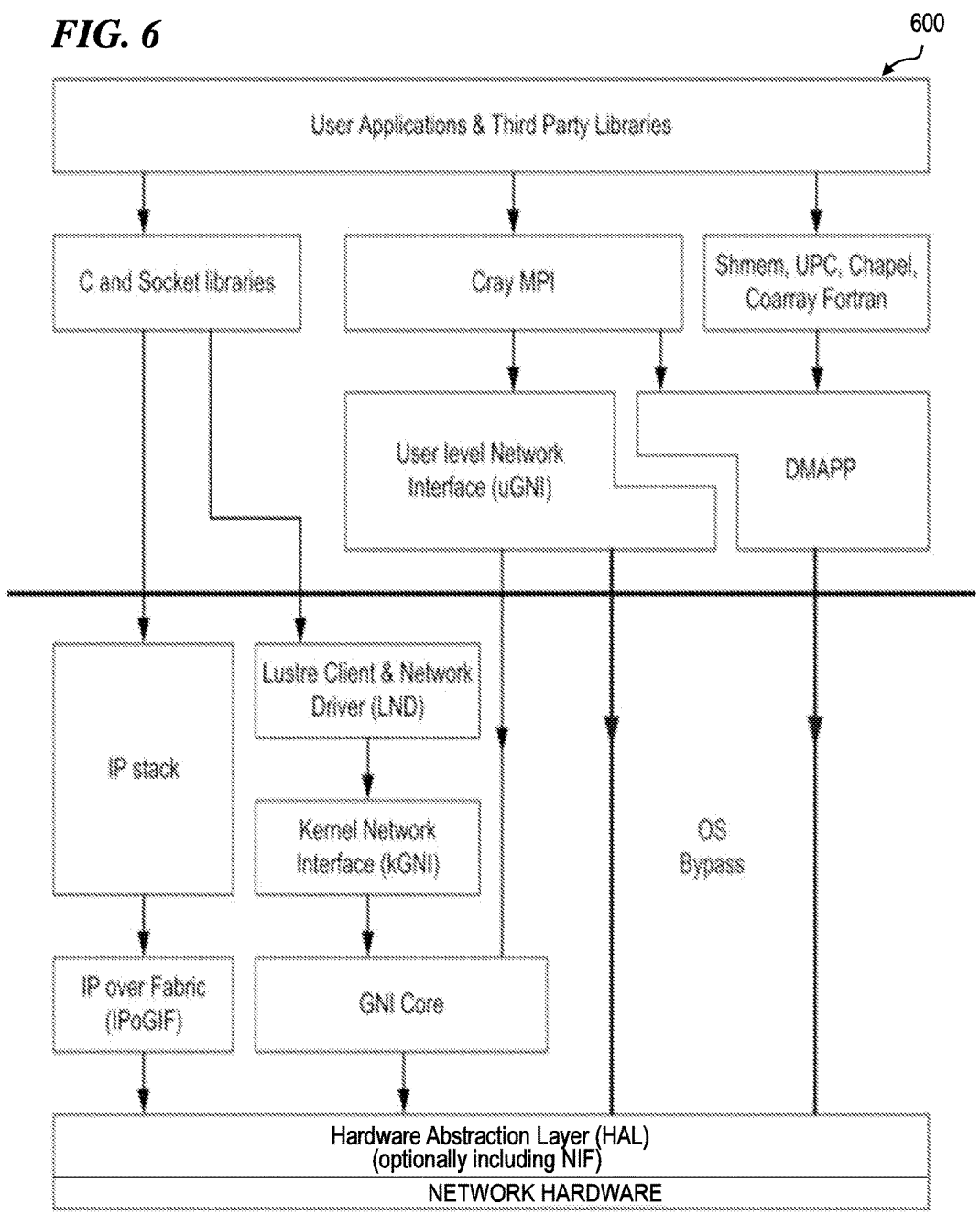
FIG. 6 shows a block diagram of one embodiment using an exemplary network software stack 600.

FIG. 6 shows a block diagram of one embodiment using an exemplary network software stack 600. In some embodiments, a high degree of compatibility is maintained with an existing (e.g., the Cray XE6) system. In some embodiments, implementations of GNI and DMAPP in the software stack used in some embodiments of the present invention build on those for the conventional "Gemini" NIC of the Cray XE6, adding support for new features. Compatibility is maintained for software that uses these interfaces.

In some embodiments, the software of the present invention uses the MPICH2 software code distribution from Argonne National Laboratory. In some embodiments, the MPI (message-passing interface) implementation uses a Nemesis driver for the network-router and NIF functions layered over uGNI. (See H. Pritchard, I. Gorodetsky, and D. Buntinas. "A uGNI based MPICH2 Nemesis Network Module for the Cray XE." In *Proceedings of the 18th European MPI Users' Group Conference on Recent Advances in the Message Passing Interface, EuroMPI '11*, pp. 110-119, Springer-Verlag, 2011.) Use of FMA (fast memory access) gives MPI applications the ability to pipeline large numbers of small, low-latency transfers—an increasingly important requirement for strong scaling on multicore nodes. Where space is available, intermediate size messages are sent eagerly to pre-allocated system buffers. Large messages are transferred using a rendezvous protocol in which bulk data transfer occurs after matching of an MPI message header and a receive request. Message matching is progressed by each call, or in the case of large messages, using an optional progress thread. The block-transfer engine (BTE) is used to provide high-bandwidth, good overlap of computation and communication, and efficient use of main memory bandwidth. Implementation of latency sensitive collectives, including MPI_Allreduce and MPI_Barrier collective-reduction operations, is optimized using the collective engine described above.

Cray SHMEM (shared memory) provides an explicit one-sided communication model. (See Cray Research, Inc. "SHMEM Technical Note for C," SG-25 16 2.3, 1994.) Each process executes in its own address space but can access segments of the memory of other processes, typically the static data segment and the symmetric heap through a variety of put and get calls, AMO (atomic memory operations) calls, and collectives. Since the Cray T3D system, Cray supercomputers have supported Cray SHMEM. Its implementation for the present invention provides the application programmer with fine-grain control of communication with minimum overhead.

In some embodiments, the deadlock-avoidance engine contains a plurality of storage elements or RAMs. In some embodiments, as shown in Table 1, the DLA RAMs include:

TABLE 1

| Name | Sub-unit | Data | Checkbits | Size | Comment |
|---|---|---|---|---|---|
| enq_ram | Enqueue | 31 | 7 | 128 × 38 | Allocation CQ event data |
| deq_ram | Enqueue | 44 | 7 | 128 × 51 | DLA Marker CQ event data |
| ram_b0d0lo | Dequeue | 36 | * | 4096 × 36 | Bank 0 data 0 lower |
| ram_b0d0hi | Dequeue | 37 | * | 4096 × 37 | Bank 0 data 0 higher and tail bit |
| ram_b0d1lo | Dequeue | 36 | * | 4096 × 36 | Bank 0 data 1 lower |
| ram_b0d1hi | Dequeue | 37 | * | 4096 × 37 | Bank 0 data 1 higher and tail bit |
| ram_b1d0lo | Dequeue | 36 | * | 4096 × 36 | Bank 1 data 0 lower |
| ram_b1d0hi | Dequeue | 37 | * | 4096 × 37 | Bank 1 data 0 higher and tail bit |
| ram_b1d1lo | Dequeue | 36 | * | 4096 × 36 | Bank 1 data 1 lower |
| ram_b1d1hi | Dequeue | 37 | * | 4096 × 37 | Bank 1 data 1 higher and tail bit |

The following table (Table 2) lists exceptions and errors detected by DLA hardware, in some embodiments. For every error listed in the table, an error is recorded.

TABLE 2

| Sub-Unit | Mnemonic | Definition | Action |
|---|---|---|---|
| DEQUEUE | FIFO_DATA1_MBE | FIFO data packet MBE upper | Dropped if DLA MARKER packet |
| DEQUEUE | FIFO_DATA1_SBE | FIFO data packet SBE upper | Corrected |
| DEQUEUE | FIFO_DATA0_MBE | FIFO data packet MBE lower | Dropped if DLA MARKER packet |
| DEQUEUE | FIFO_DATA0_SBE | FIFO data packet SBE lower | Corrected |
| ENQUEUE | MARKER_RAM_MBE | DLA Marker CQE data RAM MBE | Marker CQE dropped |
| ENQUEUE | MARKER_RAM_SBE | DLA Marker CQE data RAM SBE | Corrected |
| ENQUEUE | ALLOC_RAM_MBE | Allocation status RAM MBE | Allocation CQE dropped |
| ENQUEUE | ALLOC_RAM_SBE | Allocation status RAM SBE | Corrected |
| DEQUEUE | FIFO_OVERFLOW | FIFO overflow | None |
| ENQUEUE | HDR_PERR | Incoming FMA request packet with header parity error | Drop packet, this error has priority over FMA_PKT_ERR. |
| ENQUEUE | FMA_PKT_ERR | Incoming FMA AllocSSID, SyncComplete, or DLAMARKER request packet with an lstatus of A_STATUS_FMA_UNCORRECTABLE or A_STATUS_DATA_ERR | Drop packet |
| ENQUEUE | ALLOC_BOTH_ERR | Attempt to do both a CD and PR allocation | Do neither a CD or a PR allocation |
| ENQUEUE | DATA1_MBE | Incoming FMA request packet with upper data field MBE | Error is reported, packet with data flit MBE is propagated |
| ENQUEUE | DATA1_SBE | Incoming FMA request packet with upper data field SBE | Corrected |
| ENQUEUE | DATA0_MBE | Incoming FMA request packet with lower data field MBE | Error is reported, packet with data flit MBE is propagated |
| ENQUEUE | DATA0_SBE | Incoming FMA request packet with lower data field SBE | Corrected |
| DEQUEUE | FIFO_HDR_MBE | Dequeued FIFO packet header with MBE | Dropped |
| DEQUEUE | FIFO_HDR_SBE | Dequeued FIFO packet header with SBE | Corrected |

The external interfaces of the DLA engine, for some embodiments wherein the DLA engine is wholly or partially implemented in hardware, are listed in the following Table 3.

TABLE 3

| I/O | Name | Description |
|---|---|---|
| | | System Interface |
| input | cclk | system clock |
| input | i_reset | system reset |
| input | i_warm_reset | warm reset |
| | | FMA Interface |
| input | i_fma_dla_req_header | FMA request header |
| input | i_fma_dla_req_count[3:0] | FMA request half-flit count, valid with header |
| input | i_fma_dla_req_sb[1:0] | FMA request sideband |
| input | i_fma_dla_req_flit[143:0] | FMA request flit |
| output | r_q_dla_fma_req_ack[3:0] | FMA request half flit acknowledge |
| | | TARB Interface |
| output | r_q_dla_tarb_req_flit[143:0] | TARB Request Channel Flit |
| output | r_q_dla_tarb_req_sb[1:0] | TARB Request Channel Sideband |
| input | i_tarb_dla_req_ack | TARB Request Channel Acknowledge |
| output | r_q_dla_tarb_dl_rec | Gives DLA packets priority over CE and BTE in TARB. Forced to 0. |
| | PARB Interface | |
| output | r_q_dla_parb_req_flit[143:0] | PARB Request Channel Flit |
| output | r_q_dla_parb_req_sb[1:0] | PARB Request Channel Sideband |
| input | i_parb_dla_req_ack | PARB Request Channel Acknowledge |
| | | Completion Queue Interface |
| output | r_q_dla_cq_handle[10:0] | CQ handle |
| output | r_q_dla_cq_data[59:0] | CQ event data |
| output | r_q_dla_cq_valid Valid | CQ Event |
| input | i_cq_dla_ack Ack | |
| | Interrupt requests | |
| output | r_q_dla_pi_os_irq | OS interrupt to Processor Interface |
| output | r_q_dla_lb_hss_irq | HSS interrupt to Local Unit |
| | | MMR Ring and Logic Monitor (REQMON) Interface |
| input | i_reqmon_dla_ring[15:0] | MMR ring in |
| output | r_q_dla_reqmon_ring[15:0] | MMR ring out |
| output | r_q_dla_reqmon_ring_wrack | MMR write acknowledge |
| input | i_reqmon_dla_select0[7:0] | Data 0 select |
| input | i_reqmon_dla_select1[7:0] | Data 1 select |
| output | r_q_dla_reqmon_data0[146:0] | Data 0 |
| output | r_q_dla_reqmon_data1[146:0] | Data 1 |
| output | r_q_dla_reqmon_cntr_inc[15:0] | Performance counter increments |

In some embodiments of the present invention, the deadlock-avoidance mechanism provides two different deadlock avoidance schemes:
1. Controlled Discard
2. Persistent Reservation With both schemes, software allocates space, on a per-FMA descriptor basis, in a deadlock-avoidance FIFO. The allocated space provides a "landing zone" for requests that software process (the application software) will subsequently issue using the FMA descriptor. The software process determines which scheme will be used at the time the space is allocated.

In some embodiments, the Controlled Discard scheme operates as follows: Software issues an allocation request to the deadlock-avoidance engine indicating the amount of space it needs for a block of requests it is about to issue and can immediately follow the allocation request with those requests. The deadlock-avoidance engine allocates space for the entire block if it has sufficient space available. Otherwise, the deadlock-avoidance engine discards all requests of the block. An indication is returned to application software of whether or not the allocation was successful. If the allocation was not successful, the application software later retries the allocation and the corresponding block of requests. Therefore, the application software must retain the state information that it requires to be able to retry the block until it determines that the allocation for the block was accepted by the deadlock-avoidance engine. Application software may issue successive blocks in pipeline fashion without first waiting for the allocation success or failure notification of prior blocks.

In some embodiments, the Persistent Reservation scheme operates as follows: A software process (application software) issues an allocation request to the deadlock-avoidance engine indicating an amount of space to be reserved within the deadlock-avoidance FIFO for a particular FMA descriptor. An indication is returned to the application software of whether or not the allocation was successful. Once the application software receives an indication that the allocation was successful, it may use that FMA descriptor to send any number of requests, and all will be accepted by the deadlock-avoidance engine provided that the amount of space being occupied in the FIFO, for the descriptor, never exceeds the allocated amount. The scheme includes a concept of DLA Markers that application software can insert into the FIFO. When a Marker exits the FIFO, a notification is delivered back to the application software. In this way, application software can determine when a series of prior requests have been flushed from the FIFO. Provided that the allocated FIFO space is never exceeded, application software may issue additional requests without first waiting for the notification from a prior Marker to return. This scheme does not require that application software be able to retry requests that have already been issued.

The Persistent Reservation scheme allocates portions of the deadlock-avoidance engine's request buffering capacity to particular FMA descriptors in a relatively static fashion. The Controlled Discard scheme allows the remainder of the buffering capacity to be allocated to FMA descriptors dynamically on a transaction-by-transaction basis. The Controlled Discard scheme may be best suited to message-oriented traffic. The Persistent Allocation scheme may work better in situations where previously issued requests cannot easily be reissued.

The acceptance logic determines whether or not there is sufficient unallocated space available in the FIFO to satisfy incoming allocation requests and does not honor allocation requests when space cannot be allocated. Notification of allocation success or failure is provided through completion-queue events (CQEs). A FIFO-fill-level status may be periodically written to the local node's memory. When using the Controlled Discard scheme, application software may interrogate the fill-level status prior to attempting to issue a block of requests to determine whether the space allocation for the block is likely to be successful. When using the Persistent Allocation scheme, application software may determine when a series of requests has been flushed through the FIFO by using Markers that it can insert into the FIFO. A priority mechanism is provided such that some portion of the space in the FIFO can be reserved for Controlled-Discard-mode requests associated with FMA descriptors that have been marked as having high priority.

In some embodiments, the FMA unit can store a plurality of parameters for FMA operations. FMA descriptor parameters are used to perform FMA transfers, launch BTE operations, and initiate collective operations. Every FMA request must identify the FMA descriptor to use for that request. In some embodiments, there are 127 independent FMA descriptors.

In some embodiments, application software causes the FMA function to perform some operation by sending the FMA function an ALLOC_SEQID message. In some embodiments wherein the FMA function is implemented in hardware, application software causes FMA hardware to perform some function by storing to an FMA "doorbell". A doorbell, also called a doorbell interrupt, is a memory-addressable location in the FMA hardware that, when written to, causes the FMA to execute a function. FMA doorbells include ALLOC_SEQID used to indicate the start of a transaction, and SEQCMP used to indicate the completion of a transaction.

In some embodiments, network requests generated using the FMA function are issued within the context of transactions. Application software must signal the start of a transaction by requesting a new ssid value through a store to the relevant FMA descriptor with an ALLOC_SEQID message. In some embodiments wherein the FMA function is implemented in hardware, application software stores to the relevant FMA descriptor's ALLOC_SEQID doorbell. Software signals the end of the transaction by releasing the ssid value through a store to the relevant FMA descriptor with a SEQCMP message. In some embodiments wherein the FMA function is implemented in hardware, application software signals the end of the transaction by releasing the ssid value through a store to the SEQCMP doorbell. All network requests issued between these two messages are part of the transaction. It is expected that when using Controlled Discard, one or more space allocations will be used for each transaction.

In some embodiments, there is a limit to the maximum amount of space in the deadlock-avoidance FIFO that software is allowed to reserve in a single allocation, a "maximum-allocation credit." If the size of the entire transaction is less than the maximum-allocation credit, space for the transaction, in the deadlock-avoidance FIFO, can be allocated in a single block. Otherwise, the transaction must be divided into a series of transaction blocks with space allocated independently for each block. The requests of each transaction block can immediately follow the ALLOC_SEQID request (also called ALLOC_SEQID doorbell) that was used to reserve space for the block. Successive blocks, together with their space-allocation requests, can be issued one after the other without intervening delays.

In some embodiments, to reduce the overhead associated with managing deadlock avoidance, the ALLOC_SEQID and SEQCMP messages (also called doorbells) are used to signal the start and end of each transaction block as well as the start and end of each transaction. If the entire transaction can be issued in a single block, the number of requests that need to be issued is no greater than it would need to be in the absence of the deadlock-avoidance functionality.

In some embodiments, when using a Persistent Reservation, application software will most likely issue the space-allocation request, and check for confirmation that the allocation was successful, before sending any of the requests of the transaction(s) that it is scheduled to issue using the space reservation. In this way, it will not be necessary to reissue the requests of the transaction(s) due to discard by the deadlock avoidance block. Once a Persistent Reservation has been established, any number of transactions may be issued using that reservation.

As the quantity of requests issued using a Persistent Reservation is not limited, application software must limit the rate at which it issues requests so as not to overflow its reserved space. It does this by inserting Marker requests into the FIFO. A Marker returns a notification when it exits the FIFO, providing application software with a mechanism for tracking when all requests issued prior to the Marker have been flushed from the FIFO. By limiting the number of requests issued between Markers, and, when necessary, waiting for a Marker notification to return before issuing more requests, application software is kept from overflowing its space allocation.

In some embodiments, in addition to its usage for signaling the start of a new transaction to the SSID function 243, the ALLOC_SEQID message (also called a doorbell) is also used to request the allocation of space in the deadlock-avoidance FIFO and to indicate whether the space is being requested for a Controlled Discard transaction block or for a Persistent Reservation. To facilitate these additional usages, in some embodiments, the following fields are included in the ALLOC_SEQID message (in some embodiments, the message contains 64 bits):

1. TRANSACTION_START—When set, indicates the start of a new transaction.

2. DISCARD_RESET—Indicates that this is the first reissued block once blocks have been discarded by the FMA when using Controlled Discard. Once the deadlock-avoidance engine denies a space-allocation request for a particular FMA descriptor, it denies all space-allocation requests received for that descriptor, regardless of space availability within the deadlock-avoidance FIFO, until an allocation request is received in which the DISCARD_RESET bit is set.

3. ALLOC_STATUS_RESET—When set, cancel the generation of an allocation status CQE that may still be pending at the time this allocation request is received.

4. CREDITS_REQUIRED—Value representing the amount of FIFO space being requested.

5. DLA_REISSUE—This bit should be set if the ALLOC_ SEQID message is being performed in the course of reissuing all or part of a previously issued transaction as a consequence of a previously unsuccessful Controlled Discard allocation attempt.

6. BLOCK_ID—This value is returned within allocation status CQEs to identify the allocation request(s) to which the CQE corresponds. Application software should increment this value with each allocation request issued or reissued.

7. STATUS_INTERVAL—This field controls how frequently the deadlock-avoidance logic generates allocation status CQEs for successful allocations.

8. DLA_ALLOC_CD—When set, indicates space is to be allocated in Controlled Discard mode.

9. DLA_ALLOC_PR—When set, indicates space is to be allocated in Persistent Reservation mode.

10. DLA_HIGH_PRIORITY—Identifies whether or not transactions issued using the FMA descriptor in Controlled Discard mode are considered to be high priority.

In some embodiments, in addition to its usage for signaling the end of a transaction to the SSID function 243, the SEQCMP message is also used to terminate a previous FIFO space allocation. To facilitate this additional usage, the following fields are included in the SEQCMP message (in some embodiments, this message contains 64 bits):

1. TRANSACTION_END.—. This bit is set to 1 to signal the end of a transaction to the SSID function 243.

2. SEQCMP_DLA_DEALLOC.—. This bit is set to 1 to indicate that the current FIFO space allocation should be terminated.

In some embodiments, admittance logic of the deadlock-avoidance engine generates allocation status CQEs in reaction to FIFO space-allocation requests that it receives. Space-allocation requests are generated by application software that sends an FMA descriptor ALLOC_SEQ_ID message. The logic for generating allocation-status CQEs operates on a per-FMA-descriptor basis. In some embodiments, there is not a fixed one-for-one (or one-for-n) relationship between the number of allocations attempted and the number of these CQEs generated. Instead, so that it is never necessary to stall the processing of subsequent space-allocation requests while waiting for the CQE status of a previous allocation to be issued, each CQE may report the status of a series of consecutive space-allocation requests. This means that even if software requests an allocation-status CQE for every allocation attempt (STATUS_INTERVAL=1), these CQEs will not necessarily be generated this frequently. An allocation-status CQE is guaranteed to be issued at some point after each allocation request with STATUS_INTERVAL=1, but if software has continued to issue more allocation requests while waiting for that CQE, it is possible that one or more of these additional requests will also have been received and processed before the CQE is issued. In this case, the CQE reports the status of all allocation requests processed up to the time that the CQE actually is issued.

In some embodiments, the admittance logic generates a CQE if it has the necessary flow control credits and if a CQE is ready to be generated. A CQE is ready to be generated if, since the latter of the last generated CQE or the last allocation request with ALLOC_STATUS_RESET set to 1, one or more unsuccessful space allocation attempts have occurred, including, possibly, the last request with ALLOC_STATUS_RESET set to 1, or a space allocation request has been received for which STATUS_INTERVAL is less than or equal to the number of space allocation requests that have been received since the latter of the last CQE that was generated or the last allocation request with ALLOC_STATUS_RESET set to 1 (and STATUS_INTERVAL is not equal to 0).

In some embodiments, when a CQE is generated, it indicates the allocation status of all space-allocation requests since the latter of the last CQE generated or the last allocation request with ALLOC_STATUS_RESET set to 1. When a CQE is generated, it is issued using the DLA_CQH value included in the most recently received space-allocation request.

In some embodiments, Marker notifications are generated when Markers exit the deadlock-avoidance FIFO. The removal of requests from the FIFO is never stalled to wait for a Marker notification to be delivered. If, for a particular FMA descriptor, another Marker exits the FIFO while the generation of a prior Marker notification is still pending, the earlier Marker notification is discarded and only the most recent notification is delivered.

On a per-FMA-descriptor basis, the Marker-notification logic generates a Marker-notification CQE if it has the necessary flow-control credits and if a Marker notification is ready to be generated. A Marker notification is ready to be generated if, since the last notification was generated, another Marker has exited the deadlock-avoidance FIFO.

In some embodiments, the logic for maintaining the deadlock-avoidance FIFO fill level and determining the success or failure of space-allocation attempts uses the variables described here. Together, these variables represent the FIFO fill status. In some embodiments, these variables are stored in a control block in a node's memory. In other embodiments wherein the DLA function is implemented in hardware, these variables are stored in memory-mapped registers (MMR).

1. MAX_CREDITS—This value represents the overall maximum amount of space that may be consumed in the FIFO. A space-allocation request is only successful if the sum of the FIFO space consumed by all Controlled Discard requests, reserved for all types of requests, and being requested, is less than or equal to this value. This is a software-configured value that should only be changed during node initialization.

2. MAX_LO_CD_CREDITS—A low-priority Controlled Discard space-allocation request is only successful if the sum of the FIFO space consumed by low-priority Controlled Discard requests, reserved for low-priority Controlled Discard requests, and being requested, is less than or equal to this value. This is a software-configured value that is only expected to be changed during node initialization. This value must be less than or equal to MAX_CREDITS.

3. MAX_HI_CD_CREDITS—A high-priority Controlled Discard space-allocation request is only successful if the sum of the FIFO space consumed by high-priority Controlled Discard requests, reserved for high-priority Controlled Discard requests, and the space being requested, is less than or equal to this value. This is a software-configured value that is only expected to be changed during node initialization. This value must be less than or equal to MAX_CREDITS.

4. MAX_PR_CREDITS—A Persistent Reservation space-allocation request is only successful if the sum of the space being requested and all space already reserved for Persistent Reservations is less than or equal to this value. This is a software-configured value that is only expected to be changed during node initialization. This value must be less than or equal to MAX_CREDITS.

5. MAX_LO_CD_PR_CREDITS—A low-priority Controlled Discard space-allocation request or a Persistent Reservation space-allocation request is only successful if the sum of the FIFO space consumed by low-priority Controlled Discard requests, the FIFO space reserved for low-priority Controlled Discard requests, the FIFO space reserved for Persistent Reservations, and amount of space being requested, is less than or equal to this value. This is a software-configured value that is only expected to be changed during node initialization. This value must be less than or equal to MAX_CREDITS.

6. MAX_LO_HI_CD_CREDITS—A low- or high-priority Controlled Discard space-allocation request is only successful if the sum of the FIFO space consumed by all Controlled Discard requests, the FIFO space reserved for all Controlled Discard requests, and the amount of space being requested, is less than or equal to this value. This is a software-configured value that is only expected to be changed during node initialization. This value must be less than or equal to MAX_CREDITS.

7. MAX_HI_CD_PR_CREDITS—A high-priority Controlled Discard space-allocation request or a Persistent Reservation space-allocation request is only successful if the sum of the FIFO space consumed by high-priority Controlled Discard requests, the FIFO space reserved for high-priority Controlled Discard requests, the FIFO space reserved for Persistent Reservations, and the amount of space being requested, is less than or equal to this value. This is a software-configured value that is only expected to be changed during node initialization. This value must be less than or equal to MAX_CREDITS.

8. MAX_CD_ALLOC_CREDITS—This value represents the maximum amount of space that is allowed to be allocated with a single Controlled Discard space allocation request. This is a software-configured value that is only expected to be changed during node initialization. This value must be less than or equal to MAX_CREDITS.

9. MAX_PR_ALLOC_CREDITS—This value represents the maximum amount of space that is allowed to be allocated with a single Persistent Reservation allocation request. This is a software-configured value that is only expected to be changed during node initialization. This value must be less than or equal to MAX_CREDITS.

10. CONSUMED—This calculated value represents the total amount of space, in credits, actually occupied in the FIFO. This value increases with each new request pushed into the FIFO and decreases with each request removed from the FIFO.

11. LO_CD_CONSUMED—This calculated value represents the amount of space actually occupied in the FIFO for low-priority Controlled Discard requests. This value increases with each new request pushed into the FIFO if the corresponding descriptor is in low-priority Controlled Discard mode as indicated by the descriptor variables CD_ACTIVE_i=1 and HP_ACTIVE_i=0. This value decreases with each low-priority Controlled Discard request removed from the FIFO.

12. HI_CD_CONSUMED—This calculated value represents the amount of space, in credits, actually occupied in the FIFO for high-priority Controlled Discard requests. This value increases with each new request pushed into the FIFO if the corresponding descriptor is in high-priority Controlled Discard mode as indicated by the descriptor variables CD_ACTIVE_i=1 and HP_ACTIVE_i=1. This value decreases with each high-priority Controlled Discard request removed from the FIFO.

13. PR_CONSUMED—This calculated value represents the amount of space, in credits, actually occupied in the FIFO for Persistent Reservation requests. This value increases with each new request pushed into the FIFO if the corresponding descriptor is in Persistent Reservation mode as indicated by the descriptor variables PR_ACTIVE_i=1, CD_ACTIVE_i=0. This value decreases with each Persistent Reservation request removed from the FIFO.

14. CONSUMED_PR_CREDITS_i—This calculated value represents the amount of space, in credits, occupied in the FIFO for Persistent Reservation requests associated with FMA descriptor "i". A separate instance of this variable exists for each FMA descriptor.

15. LO_CD_RESVD—This calculated value represents the total amount of unoccupied FIFO space, in credits, reserved for low-priority Controlled Discard requests.

16. HI_CD_RESVD—This calculated value represents the total amount of unoccupied FIFO space, in credits, reserved for high-priority Controlled Discard requests.

17. PR_RESVD—This calculated value represents the total amount of FIFO space, in credits, reserved for Persistent Reservation requests. Persistent Reservation requests that have been received and are present within the FIFO occupy space that is accounted for with this value.

18. RESVD_CREDITS_i—This calculated value represents the amount of FIFO space, in credits, currently reserved for FMA descriptor "i". This value is descriptor i's contribution to either LO_CD_RESVD, HI_CD_RESVD, or PR_RESVD. A separate instance of this variable exists for each FMA descriptor.

19. Allocation type: CD_ACTIVE_i, PR_ACTIVE_i, HP_ACTIVE_i—These values are set by the deadlock-avoidance engine when space is allocated for a descriptor, and are used to record whether the type of the allocation is low-priority Controlled Discard, high-priority Controlled Discard, or Persistent Reservation. These values are subsequently used to tag requests entered into the FIFO in order to enable update of the correct *_CONSUMED variable as requests are removed from the FIFO. Separate instances of these variables exist for each FMA descriptor.

20. PR_RELEASE_PENDING_i—This value is asserted between when that the deadlock-avoidance logic receives a request to release a Persistent Reservation associated with descriptor "i", and when the reservation is actually released. Persistent Reservations are not released until CONSUMED_PR_CREDITS_i drains to 0. Requests to allocate space in the FIFO for descriptor "i", that are received while this value is asserted, are not honored. A separate instance of this variable exists for each FMA descriptor.

In some embodiments, the various credit limits to which the space-allocation requests are subject, are designed to allow some minimum portion of the FIFO to be reserved for requests of one or more of the allocation types (low-priority Controlled Discard, high-priority Controlled Discard, Persistent Reservation), and to allow sharing of the remaining space in the FIFO between different allocation types.

In some embodiments, a request is a Controlled-Discard-mode request if it is a space-allocation request with DLA_ALLOC_CD=1 and PR_ACTIVE_i indicates a Persistent-Reservation-mode allocation is not already active, or if CD_ACTIVE_i indicates space is allocated for Controlled Discard mode. When CD_ACTIVE_i indicates that a Controlled-Discard-mode allocation is already active, a request to allocate space is unsuccessful and is rejected if DLA_ALLOC_PR=1 or if TRANSACTION_START=1. A rejected space-allocation request terminates any allocation already active. The following paragraphs describe DLA processing for Controlled Discard Mode Requests.

A request to allocate space with DLA_ALLOC_CD=1 and TRANSACTION_START=0 is valid and may be successful regardless of whether or not CD_ACTIVE_i indicates that a Controlled-Discard-mode allocation is already active. Such a request attempts to allocate new space by performing the following steps.

In some embodiments, a request to allocate space for a Controlled Discard block is successful if all of the following are true:
  The previous allocation request, for the descriptor, was successful or DISCARD_RESET is equal to 1
  An allocation-status CQE in which one or more unsuccessful allocation attempts is being reported is not pending. (An allocation request with ALLOC_STATUS_RESET equal to 1 cancels any allocation status CQE that may be pending from previous unsuccessful allocation attempts.)
  CREDITS_REQUIRED is less than or equal to MAX_CD_ALLOC_CREDITS.
  MAX_CREDITS is greater than or equal to LO_CD_CONSUMED+HI_CD_CONSUMED+LO_CD_RESVD+HI_CD_RESVD+PR_RESVD+CREDITS_REQUIRED.
  MAX_x_CD_CREDITS is greater than or equal to x_CD_CONSUMED+x_CD_RESVD+CREDITS_REQUIRED. x is replaced by "HI" or "LO" according to whether the allocation request is high or low priority.
  MAX_LO_HI_CD_CREDITS is greater than or equal to LO_CD_CONSUMED+HI_CD_CONSUMED+LO_CD_RESVD+HI_CD_RESVD+CREDITS_REQUIRED.
  MAX_x_CD_PR_CREDITS is greater than or equal to x_CD_CONSUMED+x_CD_RESVD+PR_RESVD+CREDITS_REQUIRED. x is replaced by "HI" or "LO" according to whether the allocation request is high or low priority.

In some embodiments, if the new Controlled Discard allocation is successful and a Controlled Discard allocation is already active, the unused credits from the already active allocation are released by subtracting RESVD_CREDITS_i from x_CD_RESVD. This occurs after the preceding tests to determine if the allocation request can be honored and before the actions noted in the following paragraph.

If the new allocation is successful, x_CD_RESVD is increased by CREDITS_REQUIRED and RESVD_CREDITS_i is set equal to CREDITS_REQUIRED.

In the preceding paragraphs, x is replaced by "HI" or "LO" according to whether the new allocation request is high or low priority. CD_ACTIVE_i is set to 1 to indicate that a Controlled-Discard-mode allocation is active. HP_ACTIVE_i is set to either 0 or 1, as appropriate, to indicate the allocation is either low- or high priority. PR_ACTIVE_i should be 0.

In some embodiments, if a new Controlled Discard allocation is not successful and a Controlled Discard allocation is already active, the already active allocation is terminated. If the allocation request is successful and must also be entered into the FIFO (TRANSACTION_START=1), it is also subject to Per-Request Processing after Block Allocation has been performed.

In some embodiments, when a request is received, it is discarded if it does not correspond to an FMA descriptor for which a successful allocation is currently active.

If a request is accepted, RESVD_CREDITS_i and x_CD_RESVD are each decreased by the amount of space actually required for the request and x_CD_CONSUMED is increased by the amount of space required for the request (x is replaced by "HI" or "LO" according to whether HP_ACTIVE_i corresponds to high or low priority Controlled Discard mode), and the request is pushed into the FIFO.

As requests are removed from the FIFO, y_CONSUMED is decreased by the amount of space that was being consumed by the request (y is replaced by "HI_CD", "LO_CD", or "PR" according to the type indicated in the side information contained in the removed request). CONSUMED_PR_CREDITS_i is also decreased when Persistent Reservation requests are removed from the FIFO.

The variable "CONSUMED" must always represent the amount of space actually in use within the FIFO. Therefore this value increases when the request is pushed into the FIFO. This value decreases by the appropriate amount with each request removed from the output of the FIFO. This value is 0 when the FIFO is empty. If CONSUMED is 0, HI_CD_CONSUMED, LO_CD_CONSUMED, PR_CONSUMED, and CONSUMED_PR_CREDITS_i should also all be 0.

In some embodiments, when a SyncComplete request in which SEQCMP_DLA_DEALLOC=1 or a DLAMarker request in which DLA_MARKER_DEALLOC=1 is received, the following occurs:
  x_CD_RESVD is reduced by RESVD_CREDITS_i. This effectively returns reserved, but unused, credits to the pool of free space available for future allocations (x is replaced by "HI" or "LO" according to whether HP_ACTIVE_i corresponds to high-priority or low-priority Controlled-Discard mode).
  RESVD_CREDITS_i is set to 0. This ensures no further requests are accepted until another successful allocation request occurs.
  CD_ACTIVE_i is cleared to 0 to indicate that an active space allocation does not exist. Terminate the transaction block in a maximum-sized SyncComplete request.

In some embodiments, as each request of a transaction block is received, the admittance logic verifies that there is space available for the request. Space is available for a Controlled Discard request if RESVD_CREDITS_i is greater than or equal to the sum of the space actually required for the request and, if the request is not either a SyncComplete request or a Marker request issued with DLA_MARKER_DEALLOC=1, the space that would be required to terminate the transaction block in a maximum-sized SyncComplete request. If space is not available for the request, the entire request is dropped and an overflow is considered to have occurred for the current FIFO space allocation. If the dropped request corresponds to a request that is normally forwarded toward the SSID function 243, an overflow is also considered to have occurred for the current transaction.

In some embodiments, DLA records whether the current FIFO space allocation has been affected by an overflow and whether the current transaction has been affected by an overflow. Overflows within the current FIFO space allocation are reported through the Marker-notification CQE mechanism. This reporting mechanism may be useful to software employing Persistent Reservations; it is not likely to be useful when Controlled Discard is being used. Overflows within a transaction are reported as follows: When a SyncComplete with TRANSACTION_END=1 is received, if an overflow has occurred within the transaction, A_STATUS_DLA_OVERFLOW is reported in the "lstatus" field of the copy of the SyncComplete entered into the FIFO for forwarding to the SSID function 243 via the TARB 242. The SSID function 243 will report the error in the source-side CQE that it can issue following the completion of the overall transaction. If destination-side message notification (DSMN) is enabled for the transaction, the error is also reported to the destination endpoint. In some embodiments, an allocation-overflow error is potentially recoverable by repeating the overall transaction in which the error occurred.

In some embodiments, a request is a Persistent-Reservation-mode request if it is a space-allocation request with DLA_ALLOC_PR=1 and CD_ACTIVE_i indicates a Controlled-Discard-mode allocation is not already active, or if PR_ACTIVE_i indicates space is already allocated for Persistent Reservation mode. The following paragraphs describe DLA processing for Persistent-Reservation-mode requests.

In some embodiments, when PR_ACTIVE_i indicates that a Persistent-Reservation-mode allocation is already active, a request to allocate space is unsuccessful and is rejected if DLA_ALLOC_PR=1 or if DLA_ALLOC_CD=1. A rejected space-allocation request terminates any allocation already active. In some embodiments, a request to allocate space for a Persistent Reservation is successful if all of the following are true:

The previous allocation request, for the descriptor, was successful or DISCARD_RESET is equal to 1.

An allocation-status CQE, in which one or more unsuccessful allocation attempts is being reported, is not pending. (An allocation request with ALLOC_STATUS_RESET equal to 1 cancels any allocation status CQE that may be pending from previous unsuccessful allocation attempts.)

CREDITS_REQUIRED is less than or equal to MAX_PR_ALLOC_CREDITS.

MAX_CREDITS is greater than or equal to LO_CD_CONSUMED+HI_CD_CONSUMED+LO_CD_RESVD+HI_CD_RESVD+PR_RESVD+CREDITS_REQUIRED.

MAX_PR_CREDITS is greater than or equal to PR_RESV+CREDITS_REQUIRED.

MAX_LO_CD_PR_CREDITS is greater than or equal to LO_CD_CONSUMED+LO_CD_RESVD+PR_RESVD+CREDITS_REQUIRED.

MAX_HI_CD_PR_CREDITS is greater than or equal to HI_CD_CONSUMED+HI_CD_RESVD+PR_RESVD+CREDITS_REQUIRED.

If the allocation is successful, PR_RESVD is increased by CREDITS_REQUIRED and RESVD_CREDITS_i is set equal to CREDITS_REQUIRED. PR_ACTIVE_i is set to 1 to indicate that a Persistent Reservation is active. CD_ACTIVE_i should be 0. If the allocation request is successful and must also be entered into the FIFO (TRANSACTION_START=1), it is also subject to Per-Request Processing after Block Allocation has been performed.

In some embodiments, when a request is received, it is discarded if it does not correspond to an FMA descriptor for which a successful allocation is currently active. It is also discarded if PR_RELEASE_PENDING_i=1. As each request of a successfully allocated block is received, it is admitted or discarded. If the request is accepted, the following occurs:

PR_CONSUMED and CONSUMED_PR_CREDITS_i are increased by the amount of space required for the request.

The request is pushed into the FIFO.

As requests are removed from the FIFO, y_CONSUMED is decreased by the amount of space that was being consumed by the request (y is replaced by "HI_CD", "LO_CD", or "PR" according to the type indicated in the information contained in the removed request). CONSUMED_PR_CREDITS_i is also decreased when Persistent Reservation requests are removed from the FIFO.

The variable "CONSUMED" must always represent the amount of space actually in use within the FIFO. Therefore this value increases when the request is pushed into the FIFO. This value decreases by the appropriate amount with each request removed from the output of the FIFO. This value is 0 when the FIFO is empty. If CONSUMED is 0, HI_CD_CONSUMED, LO_CD_CONSUMED, PR_CONSUMED, and CONSUMED_PR_CREDITS_i should also all be 0.

In some embodiments, when a SyncComplete request in which SEQCMP_DLA_DEALLOC=1 or a DLAMarker request in which DLA_MARKER_DEALLOC=1 is received, PR_RELEASE_PENDING_i is set to 1. A Persistent Reservation is not terminated until all requests in the FIFO that are accounted for by that reservation have been removed from the FIFO. As Persistent Reservation requests are removed from the FIFO, if PR_RELEASE_PENDING_i=1 and CONSUMED_PR_CREDITS_i decrements to 0, the reservation is released by performing the following operations:

PR_RESVD is reduced by RESVD_CREDITS_i. This returns the credits that were reserved for the Persistent Reservation back to the pool of free space available for future allocations.

RESVD_CREDITS_i is set to 0. This ensures no further requests are accepted until another successful allocation request occurs.

PR_ACTIVE_i is cleared to 0 to indicate that an active space allocation does not exist.

PR_RELEASE_PENDING_i is cleared to 0.

In some embodiments, as each request is received, the admittance logic verifies that there is space available for the request. Space is available for a Persistent Reservation request if RESVD_CREDITS_i is greater than or equal to the sum of CONSUMED_PR_CREDITS_i, the space actually required for the request, and (if the request is not either a SyncComplete request or a Marker request issued with DLA_MARKER_DEALLOC=1) the space that would be required to terminate the transaction block in a maximum-sized SyncComplete request. If space is not available for the request, the entire request is dropped and an overflow is considered to have occurred for the current FIFO space allocation. If the dropped request corresponds to a request that is normally forwarded toward the SSID function 243, an overflow is also considered to have occurred for the current transaction.

In some embodiments, the deadlock-avoidance engine (DLA) records whether the current FIFO space allocation has been affected by an overflow and whether the current transaction has been affected by an overflow. Overflows within the current FIFO space allocation are reported through the Marker-notification CQE mechanism. This reporting mechanism may be useful to software employing Persistent Reservations in situations where Markers occur relatively frequently while transactions are relatively long lived. In some embodiments, overflows within a transaction are reported as follows: When a SyncComplete with TRANSACTION_END=1 is received, if an overflow has occurred within the transaction, A_STATUS_DLA_OVERFLOW is reported in the lstatus field of the copy of the SyncComplete entered into the FIFO for forwarding to the SSID function 243 via the TARB 242. The SSID function 243 will report the error in the source-side CQE that it can issue following the completion of the overall transaction. If destination-side message notification (DSMN) is enabled for the transaction, the error is also reported to the destination endpoint. In some embodiments, an allocation-overflow error is potentially recoverable by repeating the overall transaction in which the error occurred.

In some embodiments, the requests of a Controlled-Discard-transaction block that software may continue to send even though the space allocation for the block may not have been successful essentially waste bandwidth on the processor interface. This wasted bandwidth could be used for requests associated with other FMA descriptors for which space has been successfully allocated and for non-FMA traffic, such as the read completions that are used to service BTE Put and Send requests. To reduce the amount of bandwidth wasted, and also to reduce contention between FMA descriptors when the total number of allocated credits is near the limit, the DLA block periodically writes a FIFO-fill-level report to processor memory. Prior to starting each transaction block, software can interrogate the FIFO's allocation-status report to determine whether the allocation for the block is likely to be successful.

In some embodiments, the FIFO capacity and allocation sizes are expressed in units of "credits". As the data received and forwarded by the deadlock-avoidance unit are in the form of NIF flits, an obvious mapping of credits to actual physical storage is to equate one credit to one NIF flit. In some embodiments, a NIF flit (or sub-packet) is 144 bits, or 18 bytes. With this mapping, 64-byte-cacheline-sized Put requests would make efficient use of the FIFO storage capacity, as each request would fully consume five flits. However, random Puts and AMOs would not; these each consume two flits, but half of the second flit is unused. Therefore, to improve the efficiency with which the FIFO storage capacity is used for these types of requests, the granularity of the DLA block's credit accounting is actually half of a flit, or 72 bits. For these types of requests, this effectively increases the FIFO capacity by 33%. The CREDITS_REQUIRED value of each allocation request must account for any "overhead" data that also passes through the deadlock-avoidance FIFO; that is, in the data being sent, there may be additional control bits or bytes that also get stored in the FIFO.

The FIFO needs to be large enough to allow for efficient FMA operation without excessive bandwidth being wasted by the transmission of Controlled-Discard-mode transaction blocks that failed to allocate in the FIFO. The FIFO size should also be large enough to support as many simultaneous Persistent Reservations as necessary with space still left for Controlled Discard allocations, and with the size of the Persistent Reservations being large enough to support a sufficient request issue rate per reservation. It is possible for all of the space in the FIFO to become allocated before the FIFO-fill-level report, indicating that the FIFO is becoming full, is able to be made visible in processor memory. Starting from an empty FIFO with no space reserved, if some reasonable number of software processes, using different FMA descriptors, each start sending a Controlled-Discard-mode transaction block at about the same time, there should be a high probability that space is able to be allocated for all of the blocks. To reduce overhead in software as well as in processor-to-network bandwidth, the maximum allowed size for each block should not be too small. Ideally it is large enough to accommodate most transactions issued using FMA.

In some embodiments, a FIFO size of about 64K bytes (7280 credits) is sufficiently large, in the absence of any Persistent Reservations, to accommodate 64 simultaneous Put transactions, with each having a size of about 640 bytes of sequential user data. However, in some embodiments that provide Persistent Reservations for a sufficiently large number of cores, an even larger FIFO size may be desirable. In some embodiments, the size of the FIFO is 16384 credits. This value is indicated by hardware through the reset value of the A_NIC_DLA_CFG_MAX MMR. Assuming a round-trip latency from the processor to network and back of 500 ns, this FIFO size is sufficient to reserve four times the round-trip latency for Controlled Discard allocations (3200 credits) with 206 credits (68 8-byte Put requests) available for each of 64 Persistent Reservations. In some embodiments, this is sufficient to support an issue rate for the cores using the Persistent Reservations of 10 ns per core with DLA Markers inserted every 16 requests.

In some embodiments, the deadlock-avoidance functionality can be disabled. When deadlock avoidance is disabled, the DLA operates as follows.

All requests that would normally pass through the FIFO, on their way to the TARB, are entered into the FIFO regardless of whether sufficient unused space is reserved in the FIFO to accommodate the request. Requests are accepted for any FMA descriptor regardless of whether prior space-allocation requests have been received or have been successful.

If the FIFO is full, the deadlock-avoidance block applies back-pressure to FMA to limit the rate at which requests can be received to the rate at which they can be removed from the FIFO. This is a primary difference compared to operation when deadlock avoidance is enabled. When it is enabled, requests are dropped if sufficient unused space has not been pre-allocated for the request.

FIFO-fill-level reports can still be generated. In some embodiments, FIFO-fill-level-report generation can be disabled.

DLA Marker notifications can still occur. In some embodiments, DLA Marker notifications can be disabled.

In some embodiments, the present invention provides a computer-implemented method for deadlock avoidance in a parallel-processor system, wherein the parallel-processor system includes a plurality of nodes, wherein each one of the plurality of nodes includes a node buffer, a processor and local memory, wherein the plurality of nodes includes a first node having a first node buffer, a second node having a second node buffer, and a third node having a third node buffer, wherein each node is operatively coupled to a plurality of other nodes, and wherein a software process executes on each one of the plurality of nodes, the method comprising: receiving, in the first node, a first command from a first software process executing in the processor of the first node, to reserve N1 allocation units of space in the first node buffer for communication between the first software process executing in the processor of the first node and other software processes executing in processors of other nodes, wherein N1 is a number between one and a total size of the first node buffer, checking whether the first node buffer contains at least N1 unreserved allocation units of space to satisfy the first command, and if N1 unreserved allocation units now exist in the first node buffer, then reserving N1 allocation units for use by the first process but if N1 unreserved allocation units do not now exist then denying the first command for allocation units of space, entering a first remote memory access request from the first software process into the first node buffer, indicating that an additional one of the allocation units in the first node buffer is in use, performing a first remote memory access operation by sending the first remote memory access request over the network to the second node, and communicating data between the second node and the first node based on the first remote memory access request, removing the first remote memory access request from the first node buffer, indicating that one of the allocation units in the first node buffer is no longer in use, entering a second remote memory access request from the first software process into the first node buffer, indicating that an additional one of the allocation units in the first node buffer is in use, performing a second remote memory access operation by sending the second remote memory access request over the network to the third node, which causes the third node to communicate data between the third node and the first node, removing the second remote memory access request from the first node buffer, indicating that one of the allocation units in the first node buffer is no longer in use, and receiving, in the first node, a second command from a first software process executing in the processor of the first node, to un-reserve N1 allocation units of space in the first node buffer of the first node, and un-reserving N1 allocation units of space in the node buffer of the first node.

In some embodiments of the method, the first node buffer is a first-in-first-out (FIFO) buffer.

Some embodiments of the method further include: receiving, in the first node, a third command from a second software process executing in the processor of the first node, to reserve N2 allocation units of space in the first node buffer for communication between the second software process executing in the processor of the first node and other software processes executing in processors of other nodes, wherein N2 is a number between one and a total size of the first node buffer, checking whether the first node buffer contains at least N2 unreserved allocation units of space to satisfy the third command, and if N2 unreserved allocation units now exist in the first node buffer, then reserving N2 allocation units for use by the second process but if N2 unreserved allocation units do not now exist then denying the third command for allocation units of space, entering a third remote memory access request from the second software process into the first node buffer, indicating that an additional one of the allocation units in the first node buffer is in use, performing a third remote memory access operation by sending the third remote memory access request over the network to the third node, which causes the second node to communicate data between the third node and the first node, removing the third remote memory access request from the first node buffer, indicating that one of the allocation units in the first node buffer is no longer in use, entering a fourth remote memory access request from the second software process into the first node buffer, indicating that an additional one of the allocation units in the first node buffer is in use, performing a fourth remote memory access operation by sending the fourth remote memory access request over the network to the second node, which causes the second node to communicate data between the second node and the first node, removing the fourth remote memory access request from the first node buffer, indicating that one of the allocation units in the first node buffer is no longer in use, and receiving, in the first node, a fourth command from a first software process executing in the processor of the first node, to un-reserve N2 allocation units of space in the node buffer of the first node, and un-reserving N2 allocation units of space in the node buffer of the first node.

In some embodiments of the method, the entering of the first remote memory access request from the first software process into the first node buffer further includes receiving the first remote memory access request into a first remote memory access unit in the first node, wherein the first remote memory access unit enters the first remote memory access request into the first node buffer.

Some embodiments of the method further include entering a first marker request into the first node buffer, wherein the first marker request sends a notification to the first software process once all prior requests in the first node buffer have been sent.

Some embodiments of the method further include tracking operation requests that are sent on the network from the first node to other ones of the plurality of nodes. In some embodiments, the SSID 243 performs this function.

In some embodiments of the method, the communicating of data between the second node and the first node based on the first remote memory access request further includes using a plurality of packets spaced apart in time for the communicating.

In some embodiments, the present invention provides a non-transitory computer-readable medium having instructions stored thereon for causing a suitably programmed information processor to perform a deadlock-avoidance method in a parallel-processor system, wherein the parallel-processor system includes a plurality of nodes, wherein each one of the plurality of nodes includes a node buffer, a processor and local memory, wherein the plurality of nodes includes a first node having a first node buffer, a second node having a second node buffer, and a third node having a third node buffer, wherein each node is operatively coupled to a plurality of other nodes, and wherein a software process executes on each one of the plurality of nodes, the deadlock-avoidance method comprising: receiving, in the first node, a first command from a first software process executing in the processor of the first node, to reserve N1 allocation units of space in the first node buffer for communication between the first software process executing in the processor of the first node and other software processes executing in processors of other nodes, wherein N1 is a number between one and a total size of the first node buffer, checking whether the first node buffer contains at least N1 unreserved allocation units of space to satisfy the first command, and if N1 unreserved allocation units now exist in the first node buffer, then reserving N1 allocation units for use by the first process but if N1 unreserved allocation units do not now exist then denying the first command for allocation units of space, entering a first remote memory access request from the first software process into the first node buffer, indicating that an additional one of the allocation units in the first node buffer is in use, performing a first remote memory access operation by sending the first remote memory access request over the network to the second node, and communicating data between the second node and the first node based on the first remote memory access request, removing the first remote memory access request from the first node buffer, indicating that one of the allocation units in the first node buffer is no longer in use, entering a second remote memory access request from the first software process into the first node buffer, indicating that an additional one of the allocation units in the first node buffer is in use, performing a second remote memory access operation by sending the second remote memory access request over the network to the third node, which causes the third node to communicate data between the third node and the first node, removing the second remote memory access request from the first node buffer, indicating that one of the allocation units in the first node buffer is no longer in use, and receiving, in the first node, a second command from a first software process executing in the processor of the first node, to un-reserve N1 allocation units of space in the first node buffer of the first node, and un-reserving N1 allocation units of space in the node buffer of the first node.

In some embodiments of the non-transitory computer-readable medium, the first node buffer is a first-in-first-out (FIFO) buffer.

In some embodiments of the non-transitory computer-readable medium, the medium further includes instructions such that the method further includes receiving, in the first node, a third command from a second software process executing in the processor of the first node, to reserve N2 allocation units of space in the first node buffer for communication between the second software process executing in the processor of the first node and other software processes executing in processors of other nodes, wherein N2 is a number between one and a total size of the first node buffer, checking whether the first node buffer contains at least N2 unreserved allocation units of space to satisfy the third command, and if N2 unreserved allocation units now exist in the first node buffer, then reserving N2 allocation units for use by the second process but if N2 unreserved allocation units do not now exist then denying the third command for allocation units of space, entering a third remote memory access request from the second software process into the first node buffer, indicating that an additional one of the allocation units in the first node buffer is in use, performing a third remote memory access operation by sending the third remote memory access request over the network to the third node, which causes the second node to communicate data between the third node and the first node, removing the third remote memory access request from the first node buffer, indicating that one of the allocation units in the first node buffer is no longer in use, entering a fourth remote memory access request from the second software process into the first node buffer, indicating that an additional one of the allocation units in the first node buffer is in use, performing a fourth remote memory access operation by sending the fourth remote memory access request over the network to the second node, which causes the second node to communicate data between the second node and the first node, removing the fourth remote memory access request from the first node buffer, indicating that one of the allocation units in the first node buffer is no longer in use, and receiving, in the first node, a fourth command from a first software process executing in the processor of the first node, to un-reserve N2 allocation units of space in the node buffer of the first node, and un-reserving N2 allocation units of space in the node buffer of the first node.

In some embodiments of the non-transitory computer-readable medium, the medium further includes instructions such that the entering of the first remote memory access request from the first software process into the first node buffer further includes receiving the first remote memory access request into a first remote memory access unit in the first node, wherein the first remote memory access unit enters the first remote memory access request into the first node buffer.

In some embodiments of the non-transitory computer-readable medium, the medium further includes instructions such that the method further includes entering a first marker request into the first node buffer, wherein the first marker request sends a notification to the first software process once all prior requests in the first node buffer have been sent.

In some embodiments of the non-transitory computer-readable medium, the medium further includes instructions such that the method further includes tracking operation requests that are sent on the network from the first node to other ones of the plurality of nodes.

In some embodiments of the non-transitory computer-readable medium, the medium further includes instructions such that the communicating of data between the second node and the first node based on the first remote memory access request further includes using a plurality of packets spaced apart in time for the communicating.

In some embodiments, the present invention provides a parallel-processor system that includes: a plurality of nodes, wherein each one of the plurality of nodes includes a node buffer, a processor and local memory, wherein the plurality of nodes includes a first node having a first node buffer, a second node having a second node buffer, and a third node having a third node buffer, wherein each node is operatively coupled to a plurality of other nodes, and wherein a software process executes on each one of the plurality of nodes. This system includes:

a receiver in the first node that receives a first command from a first software process executing in the processor of the first node, to reserve N1 allocation units of space in the first node buffer for communication between the first software process executing in the processor of the first node and other software processes executing in processors of other nodes, wherein N1 is a number between one and a total size of the first node buffer, a checker that checks whether the first node buffer contains at least N1 unreserved allocation units of space to satisfy the first command, and if N1 unreserved allocation units now exist in the first node buffer, then reserves N1 allocation units for use by the first process but if N1 unreserved allocation units do not now exist then denies the first command for allocation units of space, a loader that enters a first remote memory access request from the first software process into the first node buffer, an indicator that indicates that an additional one of the allocation units in the first node buffer is in use, a communicator that causes performance of a first remote memory access operation by sending the first remote memory access request over the network to the second node, and causes communication of data between the second node and the first node based on the first remote memory access request, an unloader that removes the first remote memory access request from the first node buffer, wherein the indicator indicates that one of the allocation units in the first node buffer is no longer in use, wherein the loader enters a second remote memory access request from the first software process into the first node buffer, wherein the indicator indicates that an additional one of the allocation units in the first node buffer is in use, wherein the communicator causes performance of a second remote memory access operation by sending the second remote memory access request over the network to the third node, which causes the third node to communicate data between the third node and the first node, wherein the unloader removes the second remote memory access request from the first node buffer, wherein the indicator indicates that one of the allocation units in the first node buffer is no longer in use, and wherein the receiver in the first node receives a second command from a first software process executing in the processor of the first node, to un-reserve N1 allocation units of space in the first node buffer of the first node, and un-reserves N1 allocation units of space in the node buffer of the first node.

In some embodiments of the system, the first node buffer is a first-in-first-out (FIFO) buffer.

In some embodiments of the system, the receiver in the first node receives a third command from a second software process executing in the processor of the first node, to reserve N2 allocation units of space in the first node buffer for communication between the second software process executing in the processor of the first node and other software processes executing in processors of other nodes, wherein N2 is a number between one and a total size of the first node buffer, the checker checks whether the first node buffer contains at least N2 unreserved allocation units of space to satisfy the third command, and if N2 unreserved allocation units now exist in the first node buffer, then reserving N2 allocation units for use by the second process but if N2 unreserved allocation units do not now exist then denying the third command for allocation units of space, the loader enters a third remote memory access request from the second software process into the first node buffer, the indicator indicates that an additional one of the allocation units in the first node buffer is in use, the communicator that causes performance of a third remote memory access operation by sending the third remote memory access request over the network to the third node, which causes the second node to communicate data between the third node and the first node, the unloader removes the third remote memory access request from the first node buffer, the indicator indicates that one of the allocation units in the first node buffer is no longer in use, the loader enters a fourth remote memory access request from the second software process into the first node buffer, the indicator indicates that an additional one of the allocation units in the first node buffer is in use, the communicator that causes performance a fourth remote memory access operation by sending the fourth remote memory access request over the network to the second node, which causes the second node to communicate data between the second node and the first node, the unloader removes the fourth remote memory access request from the first node buffer, the indicator indicates that one of the allocation units in the first node buffer is no longer in use, and the receiver in the first node receives a fourth command from a first software process executing in the processor of the first node, to un-reserve N2 allocation units of space in the node buffer of the first node, and un-reserving N2 allocation units of space in the node buffer of the first node.

In some embodiments, the loader that enters of the first remote memory access request from the first software process into the first node buffer further includes a receiver that receives the first remote memory access request into a first remote memory access unit in the first node, wherein the first remote memory access unit enters the first remote memory access request into the first node buffer.

In some embodiments, the loader enters a first marker request into the first node buffer, wherein the first marker request sends a notification to the first software process once all prior requests in the first node buffer have been sent.

Some embodiments further include a tracker that tracks operation requests that are sent on the network from the first node to other ones of the plurality of nodes.

In some embodiments, the present invention provides a parallel-processor system that includes: a plurality of nodes, wherein each one of the plurality of nodes includes a node buffer, a processor and local memory, wherein the plurality of nodes includes a first node having a first node buffer, a second node having a second node buffer, and a third node having a third node buffer, wherein each node is operatively coupled to a plurality of other nodes, and wherein a software process executes on each one of the plurality of nodes, means for receiving, in the first node, a first command from a first software process executing in the processor of the first node, to reserve N1 allocation units of space in the first node buffer for communication between the first software process executing in the processor of the first node and other software processes executing in processors of other nodes, wherein N1 is a number between one and a total size of the first node buffer, means for checking whether the first node buffer contains at least N1 unreserved allocation units of space to satisfy the first command, and if N1 unreserved allocation units now exist in the first node buffer, then reserving N1 allocation units for use by the first process but if N1 unreserved allocation units do not now exist then denying the first command for allocation units of space, means for entering a first remote memory access request from the first software process into the first node buffer, means for indicating that an additional one of the allocation units in the first node buffer is in use, means for performing a first remote memory access operation by sending the first remote memory access request over the network to the second node, and communicating data between the second node and the first node based on the first remote memory access request, means for removing the first remote memory access request from the first node buffer, means for indicating that one of the allocation units in the first node buffer is no longer in use, means for entering a second remote memory access request from the first software process into the first node buffer, means for indicating that an additional one of the allocation units in the first node buffer is in use, means for performing a second remote memory access operation by sending the second remote memory access request over the network to the third node, which causes the third node to communicate data between the third node and the first node, means for removing the second remote memory access request from the first node buffer, means for indicating that one of the allocation units in the first node buffer is no longer in use, and means for receiving, in the first node, a second command from a first software process executing in the processor of the first node, to un-reserve N1 allocation units of space in the first node buffer of the first node, and means for un-reserving N1 allocation units of space in the node buffer of the first node.

In some embodiments of the system, the first node buffer is a first-in-first-out (FIFO) buffer.

Some embodiments of the system further include: means for receiving, in the first node, a third command from a second software process executing in the processor of the first node, to reserve N2 allocation units of space in the first node buffer for communication between the second software process executing in the processor of the first node and other software processes executing in processors of other nodes, wherein N2 is a number between one and a total size of the first node buffer, means for checking whether the first node buffer contains at least N2 unreserved allocation units of space to satisfy the third command, and if N2 unreserved allocation units now exist in the first node buffer, then reserving N2 allocation units for use by the second process but if N2 unreserved allocation units do not now exist then denying the third command for allocation units of space, means for entering a third remote memory access request from the second software process into the first node buffer, means for indicating that an additional one of the allocation units in the first node buffer is in use, means for performing a third remote memory access operation by sending the third remote memory access request over the network to the third node, which causes the second node to communicate data between the third node and the first node, means for removing the third remote memory access request from the first node buffer, means for indicating that one of the allocation units in the first node buffer is no longer in use, means for entering a fourth remote memory access request from the second software process into the first node buffer, means for indicating that an additional one of the allocation units in the first node buffer is in use, means for performing a fourth remote memory access operation by sending the fourth remote memory access request over the network to the second node, which causes the second node to communicate data between the second node and the first node, means for removing the fourth remote memory access request from the first node buffer, means for indicating that one of the allocation units in the first node buffer is no longer in use, and means for receiving, in the first node, a fourth command from a first software process executing in the processor of the first node, to un-reserve N2 allocation units of space in the node buffer of the first node, and un-reserving N2 allocation units of space in the node buffer of the first node.

In some embodiments, the means for entering of the first remote memory access request from the first software process into the first node buffer further includes means for receiving the first remote memory access request into a first remote memory access unit in the first node, wherein the first remote memory access unit enters the first remote memory access request into the first node buffer.

Some embodiments of the system further include means for entering a first marker request into the first node buffer, wherein the first marker request sends a notification to the first software process once all prior requests in the first node buffer have been sent.

Some embodiments of the system further include means for tracking operation requests that are sent on the network from the first node to other ones of the plurality of nodes.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. A computer-implemented method for deadlock avoidance in a parallel-processor system, wherein the parallel-processor system includes a plurality of network nodes, wherein each one of the plurality of network nodes includes a node buffer, a processor and local memory, and a deadlock-avoidance (DLA) engine, wherein the plurality of network nodes includes a first network node having a first node buffer, a second network node having a second node buffer, and a third network node having a third node buffer, wherein each one of the plurality of network nodes is operatively coupled to a plurality of other network nodes over a network, and wherein at least one software process executes on the respective processor of each one of the plurality of network nodes, the method comprising:

receiving, in the first network node, a first allocation command from a first application software process executing in the processor of the first network node to reserve a first space in the first node buffer for communication between the first application software process executing in the processor of the first network node and other application software processes executing in processors of other network nodes, reserving the first space for use by the first application software process, entering a first remote memory access (RMA) request from the first application software process into the first node buffer, performing a first RMA operation by sending the first RMA request over the network to the second network node, and communicating data between the second network node and the first network node based on the first RMA request, removing the first RMA request from the first node buffer, un-reserving the first space in the node buffer of the first network node;

receiving, in the first network node, a second allocation command from a second application software process executing in the processor of the first network node, to reserve a second space in the first node buffer for communication between the second application software process executing in the processor of the first network node and other application software processes executing in processors of other network nodes, reserving the second space for use by the second application software process, entering a second RMA request from the second application software process into the first node buffer, performing a second RMA operation by sending the second RMA request over the network to the third network node, and communicating data between the third network node and the first network node based on the second RMA request, removing the second RMA request from the first node buffer, and un-reserving of the second space in the node buffer of the first network node.

2. The method of claim 1, wherein the first node buffer is a first-in-first-out (FIFO) buffer.

3. The method of claim 1, further comprising:

using a persistent-reservation scheme that includes:

returning an indication to the first application software process that indicates whether the reserving of the first space was successful;

determining by the first application software process that the reserving was successful based on the indication; and accepting all RMA requests from the first application software process provided that an amount of space occupied in a FIFO buffer does not exceed the reserved amount for the first space.

4. The method of claim 1, further comprising:
using a controlled-discard scheme that includes:
immediately following the first allocation command with a block of RMA requests from the first application software process to the first node buffer;
if there is not sufficient space in the node buffer for the block of RMA requests then discarding all requests of the block and returning an indication to the first application software process that the first allocation command was not successful; and
retrying the first allocation command by the first application software process.

5. The method of claim 1, further comprising:
tracking operation requests that are sent on the network from the first network node to other ones of the plurality of network nodes.

6. The method of claim 1, wherein the communicating of data between the second network node and the first network node based on the first RMA request further includes communicating using a plurality of packets.

7. The method of claim 1, further comprising:
entering a first marker request into the first node buffer, and
sending, based on the first marker request, a notification to the first application software process once all prior requests in the first node buffer have been sent.

8. A non-transitory computer-readable medium having instructions stored thereon for causing a suitably programmed information processor to perform a deadlock-avoidance method in a parallel-processor system,
wherein the parallel-processor system includes a plurality of network nodes,
wherein each one of the plurality of network nodes includes a node buffer, a processor and local memory,
wherein the plurality of network nodes includes a first network node having a first node buffer, a second network node having a second node buffer, and a third network node having a third node buffer,
wherein each one of the plurality of network nodes is operatively coupled to a plurality of other network nodes over a network, and
wherein at least one software process executes on each one of the plurality of network nodes,
the deadlock-avoidance method comprising:
receiving, in the first network node, a first allocation command from a first software process executing in the processor of the first network node to reserve a first space in the first node buffer for communication between the first software process executing in the processor of the first network node and other software processes executing in processors of other network nodes;
reserving the first space for use by the first software process;
entering a first remote memory access (RMA) request from the first software process into the first node buffer;
performing a first RMA operation by sending the first RMA request over the network to the second network node, and communicating data between the second network node and the first network node based on the first RMA request;
removing the first RMA request from the first node buffer;
un-reserving the first space in the node buffer of the first network node;
receiving, in the first network node, a second allocation command from a second software process executing in the processor of the first network node, to reserve a second space in the first node buffer for communication between the second software process executing in the processor of the first network node and other software processes executing in processors of other network nodes;
reserving the second space for use by the second software process;
entering a second RMA request from the second software process into the first node buffer;
performing a second RMA operation by sending the second RMA request over the network to the third network node, and communicating data between the third network node and the first network node based on the second RMA request;
removing the second RMA request from the first node buffer; and
un-reserving the second space in the node buffer of the first network node.

9. The medium of claim 8, wherein the first node buffer is a first-in-first-out (FIFO) buffer.

10. The medium of claim 8, wherein the medium further includes instructions such that the method further comprises:
using a persistent-reservation scheme that includes:
returning an indication to the first application software process that indicates whether the reserving of the first space was successful;
determining by the first application software process that the reserving was successful based on the indication; and
accepting all RMA requests from the first application software process provided that an amount of space occupied in a FIFO buffer does not exceed the reserved amount for the first space.

11. The medium of claim 8, wherein the medium further includes instructions such that the method further comprises:
using a controlled-discard scheme that includes:
immediately following the first allocation command with a block of RMA requests;
if there is not sufficient space in the node buffer for the block of RMA requests then discarding all requests of the block and returning an indication to the first application software process that the first allocation command was not successful; and
retrying the first allocation command by the first application software process.

12. The medium of claim 8, wherein the medium further includes instructions such that the method further comprises:
tracking operation requests that are sent on the network from the first network node to other ones of the plurality of network nodes.

13. The medium of claim 8, wherein the medium further includes instructions such that the communicating of data between the second network node and the first network node based on the first RMA request further includes using a plurality of packets.

14. The medium of claim 8, wherein the medium further includes instructions such that the method further comprises:
entering a first marker request into the first node buffer, and
sending, based on the first marker request, a notification to the first application software process once all prior requests in the first node buffer have been sent.

15. A parallel-processor system comprising:
a plurality of network nodes, wherein each one of the plurality of network nodes includes a node buffer, a processor and local memory, wherein the plurality of network nodes includes a first network node that has a first node buffer, a second network node that has a second node buffer, and a third network node that has a third node buffer, wherein each one of the plurality of network nodes is operatively coupled to a plurality of other network nodes, and wherein at least one software process executes on each one of the plurality of network nodes, a reservation unit in the first network node configured to receive a first allocation command from a first software process that executes in the processor of the first network node, to reserve a first space in the first node buffer for communication between the first software process and other software processes that execute in processors of other network nodes, and based on the first allocation command, to reserve the first space for use by the first software process;

an RMA unit configured to enter a first remote memory access (RMA) request from the first software process into the first node buffer, to send the first RMA request over the network to the second network node, to communicate data between the second network node and the first network node based on the first RMA request, and to remove the first RMA request from the first node buffer;

wherein the reservation unit is configured to later un-reserve the first space in the node buffer of the first network node;

wherein the reservation unit is also configured to receive a second allocation command from a second software process that executes in the processor of the first network node, to reserve a second space in the first node buffer for communication between the second software process of the first network node and other software processes that execute in processors of other network nodes, and based on the second allocation command, to reserve the second space for use by the second software process;

wherein the RMA unit is also configured to enter a second RMA request from the second software process into the first node buffer, to send the second RMA request over the network to the third network node, to communicate data between the third network node and the first network node based on the second RMA request, and to remove the second RMA request from the first node buffer;

wherein the reservation unit is configured to later un-reserve the second space in the node buffer of the first network node.

16. The system of claim 15, further comprising a marker unit that enters a first marker request into the first node buffer, wherein the first marker request sends a notification to the first software process once all prior requests in the first node buffer have been sent.

17. The system of claim 15, further comprising a tracker unit configured to track operation requests that are sent on the network from the first network node to other ones of the plurality of network nodes.

18. The system of claim 15, wherein the first node buffer is a first-in-first-out (FIFO) buffer.

19. The system of claim 15,
wherein the first application software process uses a persistent-reservation scheme,
wherein the first network node includes a deadlock-avoidance (DLA) engine that returns an indication to the first application software process that indicates whether the reserving of the first space was successful,
wherein the first application software process determines that the reserving was successful based on the indication, and
wherein the DLA engine accepts all RMA requests from the first application software process provided that an amount of space occupied in a FIFO buffer does not exceed the reserved amount for the first space.

20. The system of claim 15,
wherein the first application software process uses a controlled-discard scheme,
wherein the first network node includes a deadlock-avoidance (DLA) engine,
wherein the first application software immediately follows the first allocation command with a block of RMA requests,
wherein the DLA engine allocates space for the entire block if sufficient space is available, and
wherein if the first allocation command was not successful the DLA engine discards all requests of the block and returns an indication to the first application software process that the first allocation command was not successful and the first application software process later retries the allocation command.

21. The method of claim 2, further comprising:
using a persistent-reservation scheme that includes:
    returning an indication to the first application software process that indicates whether the reserving of the first space was successful;
    determining by the first application software process that the reserving was successful based on the indication;
    accepting all RMA requests from the first application software process provided that an amount of space occupied in the FIFO buffer does not exceed the reserved amount for the first space; and
using a controlled-discard scheme that includes:
    immediately following the first allocation command with a block of RMA requests from the first application software process to the first node buffer;
    if there is not sufficient space in the node buffer for the block of RMA requests then discarding all requests of the block and returning an indication to the first application software process that the first allocation command was not successful; and
    retrying the first allocation command by the first application software process.

22. The method of claim 1, further comprising:
providing a low-priority controlled discard space-allocation request that is only successful if a sum of first-in-first-out (FIFO) space consumed by low-priority controlled discard requests, FIFO space reserved for low-priority controlled discard requests, and FIFO space being requested, is less than or equal to a maximum value for low-priority controlled discard credits;
providing a high-priority controlled discard space-allocation request that is only successful if a sum of FIFO space consumed by high-priority controlled discard requests, FIFO space reserved for high-priority controlled discard requests, and FIFO space being requested, is less than or equal to a maximum value for high-priority controlled discard credits; and
providing a persistent reservation space-allocation request that is only successful if a sum of FIFO space being requested and all FIFO space already reserved for persistent reservations is less than or equal to a maximum value for persistent reservation credits.

* * * * *